US012699600B2

(12) United States Patent
Guo et al.

(10) Patent No.: US 12,699,600 B2
(45) Date of Patent: Aug. 4, 2026

(54) TASK SCHEDULING METHOD, ELECTRONIC DEVICE, CHIP SYSTEM, AND STORAGE MEDIUM

(71) Applicant: Honor Device Co., Ltd., Shenzhen (CN)

(72) Inventors: Wenjuan Guo, Shenzhen (CN); Xuqing Liang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 534 days.

(21) Appl. No.: 18/547,560

(22) PCT Filed: Sep. 5, 2022

(86) PCT No.: PCT/CN2022/117051
§ 371 (c)(1),
(2) Date: Aug. 23, 2023

(87) PCT Pub. No.: WO2023/051178
PCT Pub. Date: Apr. 6, 2023

(65) Prior Publication Data

US 2024/0134700 A1    Apr. 25, 2024
US 2024/0231930 A9    Jul. 11, 2024

(30) Foreign Application Priority Data

Sep. 30, 2021    (CN) .......................... 202111169277.3

(51) Int. Cl.
*G06F 9/50*      (2006.01)
*G06F 9/38*      (2018.01)
*G06F 9/48*      (2006.01)
(52) U.S. Cl.
CPC .......... *G06F 9/5088* (2013.01); *G06F 9/4881* (2013.01); *G06F 9/4893* (2013.01);
(Continued)

(58) Field of Classification Search
None
See application file for complete search history.

(56) References Cited

U.S. PATENT DOCUMENTS 7,437,581 B2    10/2008    Grochowski et al.
9,329,900 B2 *    5/2016    Narvaez .............. G06F 9/45533
(Continued)

FOREIGN PATENT DOCUMENTS

CN      101076770 A    11/2007
CN      102707996 A1    10/2012
(Continued)

OTHER PUBLICATIONS

Sahin et al., "Maestro: Autonomous QOS Management for Mobile Applications Under Thermal Constraints", Aug. 2019, IEEE Transactions on Computer-Aided Design of Integrated Circuits and Systems, vol. 38, No. 8, pp. 1557-1570. (Year: 2019).*

*Primary Examiner* — Qing Yuan Wu
(74) *Attorney, Agent, or Firm* — Slater Matsil, LLP

(57) ABSTRACT

This application provides a task scheduling method, an electronic device, a chip system, and a storage medium, and relates to the field of task scheduling technologies. The method includes: In some quick response scenarios of the electronic device, for example, in a stylus scenario, some or all threads that support the scenario are set to run on a processor core with a higher computing capability, so that the processor core with a higher computing capability can quickly process the threads. In addition, after the scenario ends, the thread may be further switched from the processor core with a higher computing capability back to an original processor core.

18 Claims, 22 Drawing Sheets

(52) U.S. Cl.
CPC .......... _G06F 9/5038_ (2013.01); _G06F 9/5044_
(2013.01); _G06F 9/3877_ (2013.01)

(56) References Cited

U.S. PATENT DOCUMENTS

|  |  |  |  |  |  |
| --- | --- | --- | --- | --- | --- |
| 9,529,463 | B1 * | 12/2016 | Ramani | .................... | G09G 5/00 |
| 9,619,282 | B2 * | 4/2017 | Davis | .................... | G06F 9/4893 |
| 2003/0028851 | A1 | 2/2003 | Leung et al. | | |
| 2005/0013705 | A1 * | 1/2005 | Farkas | ................. | G06F 9/5088 |
| | | | | | 417/393 |
| 2012/0284663 | A1 | 11/2012 | Driver et al. | | |
| 2012/0317568 | A1 * | 12/2012 | Aasheim | .............. | G06F 9/5094 |
| | | | | | 718/1 |
| 2014/0129958 | A1 * | 5/2014 | Garza | ................... | G06F 9/5077 |
| | | | | | 715/748 |
| 2018/0157527 | A1 | 6/2018 | Tung et al. | | |

FOREIGN PATENT DOCUMENTS

| | | | | | |
| --- | --- | --- | --- | --- | --- |
| CN | 109284180 | A | 1/2019 | | |
| CN | 109947569 | A | 6/2019 | | |
| CN | 111831414 | A | 10/2020 | | |
| WO | WO-2014105175 | A1 * | 7/2014 | .......... | G06F 9/5094 |
| WO | WO-2022135014 | A1 * | 6/2022 | .......... | G06F 9/4856 |

* cited by examiner

Handwriting     Writing track     Stylus

Handwriting     Writing track     Stylus

TASK SCHEDULING METHOD, ELECTRONIC DEVICE, CHIP SYSTEM, AND STORAGE MEDIUM

CROSS-REFERENCE TO RELATED APPLICATIONS

This application is a national stage of International Application No. PCT/CN2022/117051, filed on Sep. 5, 2022, which claims priority to Chinese Patent Application No. 202111169277.3, filed on Sep. 30, 2021. The disclosures of both of the aforementioned applications are hereby incorporated by reference in their entireties.

TECHNICAL FIELD

This application relates to the task management field, and in particular, to a task scheduling method, an electronic device, a chip system, and a storage medium.

BACKGROUND

As electronic devices become more intelligent, more functions are provided by the electronic devices. The function provided by the electronic device needs to be implemented by processing a corresponding task by a processor (central processing unit, CPU) in the electronic device. Some functions provided by the electronic device impose a high requirement on a capability of the processor. In an example, Notepad installed in a tablet computer provides a stylus function that has a high requirement on the capability of the processor.

When the capability of the processor is insufficient to support fast execution of a task, the task may cause system lag of the electronic device, or even affect execution of another task. Currently, execution time of the task may be shortened by setting the task as a high-priority task or in another manner. However, a processor core that processes the task may further need to process another task. If the task is preferentially processed, the processor core may be impeded from processing the another task. As a result, overall performance of the electronic device is affected.

SUMMARY

This application provides a task scheduling method, an electronic device, a chip system, and a storage medium, to improve performance of an electronic device.

To achieve the foregoing objective, the following technical solutions are used in this application:

According to a first aspect, this application provides a task scheduling method. The method includes:

An electronic device displays an interface of a first application, where a first thread runs on a first CPU core, and the first thread is used for display processing of the interface of the first application;

the electronic device receives first input of a stylus in the interface of the first application; and in response to the first input, the electronic device controls the first thread to run on a second CPU core, where a computing capability of the second CPU core is higher than a computing capability of the first CPU core.

In this application, when the electronic device displays the interface of the first application (for example, a Notepad application), the first thread used for display processing of the interface of the first application runs on the first CPU core. When a user starts a handwriting operation in the interface of the first application by using the stylus, to enable handwriting to be smooth, a processing speed of the first thread related to display processing of the interface for displaying handwriting may be increased. In actual application, the electronic device may set the first thread to run on the second CPU core. The second CPU core has a higher computing capability than the first CPU core. Therefore, the second CPU core can process the first thread faster than the first CPU core, thereby improving performance of the electronic device. From a perspective of the user, a handwriting process of the stylus is smooth.

In an implementation of the first aspect of this application, the first thread is a thread in a first control group, the thread in the first control group is allowed to run on any CPU core in a first CPU core set, and the first CPU core is any CPU core in the first CPU core set.

In an implementation of the first aspect of this application, after the electronic device controls the first thread to run on the second CPU core, the method further includes:

The electronic device receives a second operation, where the second operation includes an operation of exiting the first application, an operation of switching the first application to background, or an operation of touching the interface of the first application by a user; and in response to the second operation, the electronic device controls the first thread to run on a third CPU core, where the third CPU core is a CPU core in the first CPU core set.

In this application, after a same scenario (for example, a stylus scenario) ends, the thread may be further switched from a CPU core with a higher computing capability back to an original CPU core, to avoid a problem of excessively high power consumption caused because the thread always runs on the processor core with a higher computing capability.

In an implementation of the first aspect of this application, before the electronic device controls the first thread to run on the second CPU core, the method further includes:

The electronic device sets the first thread as a thread in a second control group, where the thread in the second control group is allowed to run on any CPU core in a second CPU core set, and the second CPU core is a CPU core in the second CPU core set.

In this application, when the first CPU core set of the first control group does not include the second CPU core, the first thread may be migrated to the second control group that is allowed to run on the second CPU core. Therefore, the first thread can be switched to the second CPU core for running. Certainly, the second control group may be a root control group.

In an implementation of the first aspect of this application, after the electronic device controls the first thread to run on the second CPU core, the method further includes:

The electronic device receives a second operation, where the second operation includes an operation of exiting the first application, an operation of switching the first application to background, or an operation of touching the interface of the first application by a user;

in response to the second operation, the electronic device sets the first thread as a thread in the first control group; and the electronic device controls the first thread to run on a fourth CPU core, where the fourth CPU core is any CPU core in the first CPU core set.

In this application, when a scenario (for example, a stylus scenario) is disabled, if a control group of the first thread has been switched when the same scenario is enabled, the first thread needs to be switched back to an original control group when the scenario is disabled. Therefore, after the scenario ends, the first thread returns to run on a CPU core specified by the original control group, to avoid excessively high power consumption of the electronic device.

In an implementation of the first aspect of this application, the first input of the stylus in the interface of the first application includes:

input generated when the stylus is in contact with a handwriting interface of the first application for the first time after the first application runs in foreground.

In an implementation of the first aspect of this application, the second operation is the operation of touching the interface of the first application by the user, and the first input of the stylus in the interface of the first application includes:

input generated when the stylus is in contact with a handwriting interface of the first application for the first time after the electronic device receives the second operation.

In an implementation of the first aspect of this application, the display processing includes at least one of drawing processing, rendering processing, and composition processing.

In an implementation of the first aspect of this application, before the electronic device sets the first thread as a thread in the second control group, the method further includes:

The electronic device stores the first thread and the first control group into a first storage space.

Correspondingly, before the electronic device sets the first thread as a thread in the first control group, the method includes:

The electronic device obtains the first thread and the first control group by querying the first storage space.

In this application, when a scenario is enabled, if a control group of the first thread needs to be switched, an original control group of the thread needs to be cached, so that the original control group of the first thread can be obtained based on the cached information when the scenario is disabled.

In an implementation of the first aspect of this application, that the electronic device controls the first thread to run on the second CPU core includes:

The electronic device obtains a third CPU core set, where the third CPU core set is a CPU core configured for the first thread; and when the first CPU core set and the third CPU core set include same CPU cores, the electronic device controls the first thread to run on the second CPU core, where the second CPU core is one of the same CPU cores.

In an implementation of the first aspect of this application, that the electronic device sets the first thread as a thread in the second control group includes:

The electronic device obtains a third CPU core set, where the third CPU core set is a CPU core configured for the first thread; and when the first CPU core set and the third CPU core set do not include same CPU cores, the electronic device sets the first thread as a thread in the second control group, where the second CPU core is one of same CPU cores included in the second CPU core set and the third CPU core set.

In an implementation of the first aspect of this application, that the electronic device controls the first thread to run on the second CPU core includes:

The electronic device obtains a third CPU core set, where the third CPU core set is a CPU core configured for the first thread;

the electronic device sets, as a CPU core in the third CPU core set, a CPU core on which the first thread runs;

when the setting fails, the electronic device sets the first thread as a thread in the second control group, where the second CPU core set and the third CPU core set include same CPU cores; and after setting the first thread as a thread in the second control group, the electronic device sets, as a CPU core in the third CPU core set, the CPU core on which the first thread runs, where after the setting succeeds, the first thread runs on the second CPU core, and the second CPU core is one of the same CPU cores included in the second CPU core set and the third CPU core set.

In an implementation of the first aspect of this application, the method further includes:

After the electronic device is powered on, the electronic device obtains a configuration file, where the configuration file is used to configure the first thread for a first scenario identifier and configure the third CPU core set for the first thread; the electronic device parse the configuration file to obtain parsing information; and the electronic device stores the parsing information based on a map data structure.

Correspondingly, that the electronic device obtains a third CPU core set includes:

In response to the first input, the electronic device determines the first scenario identifier; and the electronic device obtains, from the parsing information, the first thread configured for the first scenario identifier and the third CPU core set configured for the first thread.

In an implementation of the first aspect of this application, that the electronic device obtains, from the parsing information, the first thread configured for the first scenario identifier includes:

The electronic device obtains, from the parsing information, a first thread name of the first thread configured for the first scenario identifier.

Correspondingly, that the electronic device controls the first thread to run on a second CPU core includes:

The electronic device searches a first file system for a thread identifier that matches the first thread name, where the first file system stores a thread name and a thread identifier of a thread currently running on the electronic device; and when the electronic device obtains, by searching the first file system, a first thread identifier corresponding to the first thread name, the electronic device controls the first thread represented by the first thread identifier to run on the second CPU core.

In an implementation of the first aspect of this application, before the electronic device searches the first file system for the thread identifier corresponding to the first thread name, the method further includes:

The electronic device searches a second file for the thread identifier corresponding to the first thread name.

Correspondingly, that the electronic device searches a first file system for a thread identifier corresponding to the first thread name includes:

When the electronic device does not obtain, by searching the second file, the thread identifier corresponding to the first thread name, the electronic device searches the first file system for the thread identifier corresponding to the first thread name.

Correspondingly, when the electronic device obtains, by searching the first file system, the first thread identifier corresponding to the first thread name, the method further includes:

The electronic device stores, into the second file, the first thread identifier corresponding to the first thread name.

In an implementation of the first aspect of this application, after the electronic device searches the second file for the thread identifier corresponding to the first thread name, the method further includes:

When the electronic device obtains, by searching the second file, the first thread identifier corresponding to the first thread name, the electronic device sets the first thread represented by the first thread identifier to run on the second CPU core.

According to a second aspect, an electronic device is provided, including a processor. The processor is configured to run a computer program stored in a memory, to implement the method according to any one of the implementations of the first aspect of this application.

According to a third aspect, a chip system is provided, including a processor. The processor is coupled to a memory, and the processor executes a computer program stored in the memory, to implement the method according to any one of the implementations of the first aspect of this application.

According to a fourth aspect, a computer-readable storage medium is provided. The computer-readable storage medium stores a computer program, and when the computer program is executed by one or more processors, the method according to any one of the implementations of the first aspect of this application is implemented.

According to a fifth aspect, this application provides a computer program product. When the computer program product runs on a device, the device is enabled to perform the method according to any one of the implementations of the first aspect of this application.

It may be understood that, for beneficial effects of the second aspect to the fifth aspect, refer to related descriptions in the first aspect. Details are not described herein again.

DETAILED DESCRIPTION OF ILLUSTRATIVE EMBODIMENTS

In the following descriptions, for the purpose of description instead of limitation, specific details such as a specific system structure and a technology are proposed, to provide a thorough understanding of embodiments of this application. However, persons skilled in the art should understand that this application may also be implemented in another embodiment without these specific details.

It should be understood that when being used in this specification and the appended claims of this application, the term "include" indicates presence of a described characteristic, entirety, step, operation, element, and/or component, but does not rule out presence or addition of one or more other characteristics, entireties, steps, operations, elements, components, and/or sets thereof.

It should be further understood that in the embodiments of this application, "one or more" means one, two, or more than two, and "and/or" describes an association relationship between associated objects and indicates that three relationships may exist. For example, A and/or B may indicate the following cases: Only A exists, both A and B exist, and only B exists, where A and B may be singular or plural. The character "/" generally indicates an "or" relationship between associated objects.

In addition, in this specification and the appended claims of this application, the terms such as "first", "second", "third", and "fourth" are used only to distinguish descriptions, and should not be understood as indicating or implying relative importance.

Referring to "one embodiment", "some embodiments", or the like that is described in this specification of this application means that specific characteristics, structures, or features described with reference to one or more embodiments are included in the one or more embodiments of this application. Therefore, the statements "in one embodiment", "in some embodiments", "in some other embodiments", "in some other embodiments", and the like that appear in different parts of this specification are not necessarily referred to a same embodiment, but mean "one or more but not all embodiments", unless otherwise specifically emphasized. The terms "include", "comprise", and "have" and variants thereof all mean "include but are not limited to", unless otherwise specially emphasized.

Embodiments of this application provide a task scheduling method, and the method may be applied to an electronic device. The electronic device may be a tablet computer, a mobile phone, a wearable device, a notebook computer, an ultra-mobile personal computer (ultra-mobile personal computer, UMPC), a netbook, a personal digital assistant (personal digital assistant, PDA), or another electronic device. A specific type of the electronic device is not limited in the embodiments of this application.

Figure 1:
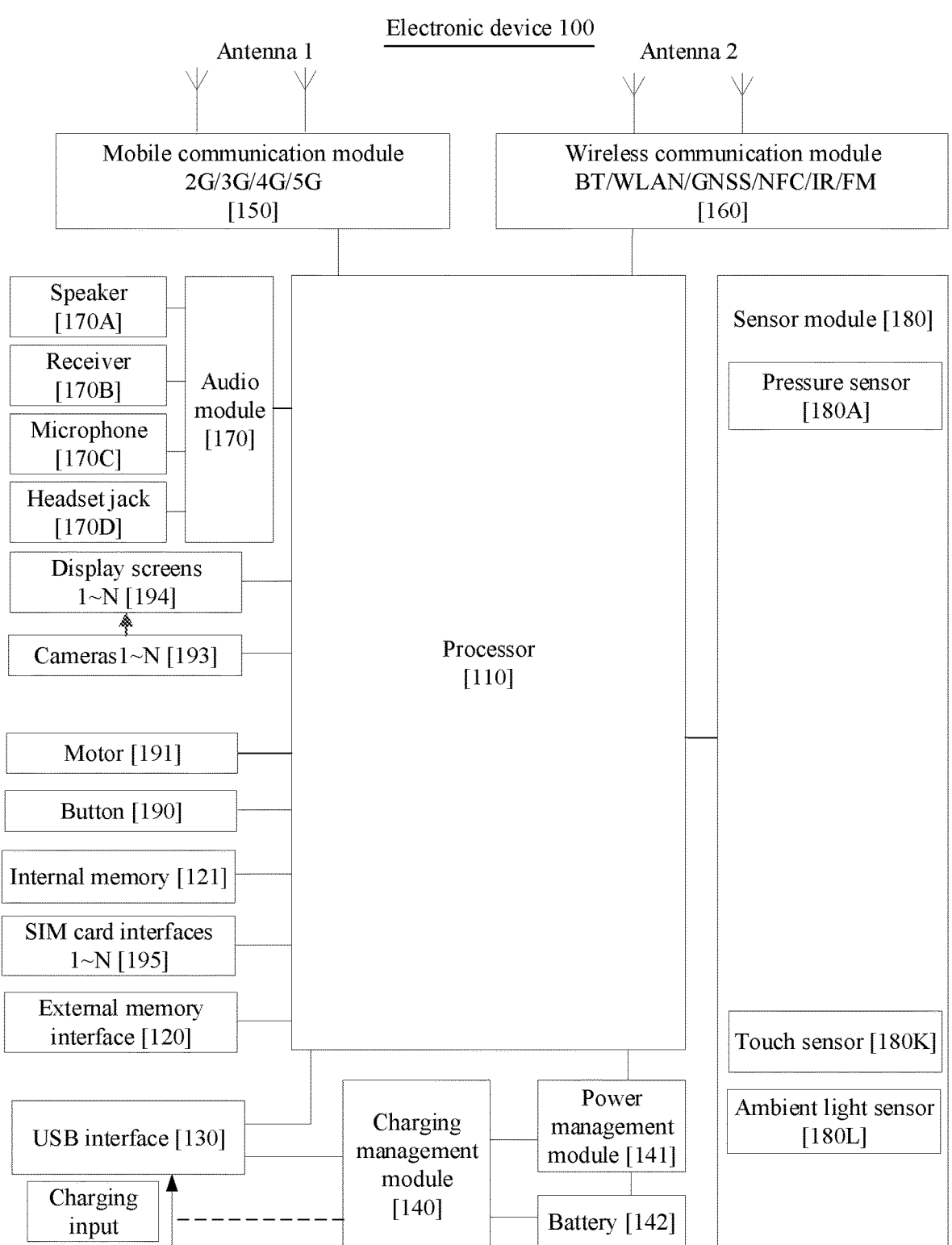
FIG. 1 is a schematic diagram of a hardware structure of an electronic device according to an embodiment of this application.

FIG. 1 is a schematic diagram of a structure of an electronic device. The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, a camera 193, a display screen 194, a subscriber identity module (subscriber identification module, SIM) card interface 195, and the like. The sensor module 180 may include a pressure sensor 180A, a touch sensor 180K, an ambient light sensor 180L, and the like.

It may be understood that the structure illustrated in this embodiment of this application constitutes no specific limitation on the electronic device 100. In some other embodiments of this application, the electronic device 100 may include more or fewer components than those shown in the figure, combine some components, split some components, or have different component arrangements. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent devices, or may be integrated into one or more processors. For example, the processor 110 is configured to perform the task scheduling method in the embodiments of this application.

The controller may be a nerve center and a command center of the electronic device 100. The controller may generate an operation control signal based on instruction operation code and a sequence signal, to complete control of instruction fetching and instruction execution.

A memory may be further disposed in the processor 110, and is configured to store instructions and data. In some embodiments, the memory in the processor 110 is a cache. The memory may store instructions or data that are or is just used or cyclically used by the processor 110. If the processor 110 needs to use the instructions or the data again, the processor 110 may directly invoke the instructions or the data from the memory. This avoids repeated access and reduces waiting time of the processor 110, thereby improving system efficiency.

The USB interface 130 is an interface that complies with a USB standard specification, and may be specifically a Mini USB interface, a Micro USB interface, a USB Type C interface, or the like. The USB interface 130 may be configured to connect to a charger to charge the electronic device 100, or may be configured to transmit data between the electronic device 100 and a peripheral device.

The external memory interface 120 may be configured to connect an external storage card, for example, a Micro SD card, to expand a storage capacity of the electronic device 100. The external storage card communicates with the processor 110 through the external memory interface 120, to implement a data storage function, for example, to store files such as music and a video into the external storage card.

The internal memory 121 may be configured to store computer-executable program code, and the executable program code includes instructions. The processor 110 executes various function applications and data processing of the electronic device 100 by running the instructions stored in the internal memory 121. The internal memory 121 may include a program storage area and a data storage area. The program storage area may store an operating system and an application program required by at least one function (such as a sound playing function and an image playing function).

In addition, the internal memory 121 may include a high-speed random access memory, and may further include a nonvolatile memory, for example, at least one magnetic disk storage device, a flash memory device, or a universal flash storage (universal flash storage, UFS).

The charging management module 140 is configured to receive charging input from a charger. The charger may be a wireless charger, or may be a wired charger. In some embodiments of wired charging, the charging management module 140 may receive charging input of a wired charger through the USB interface 130.

The power management module 141 is configured to connect to the battery 142, the charging management module 140, and the processor 110. The power management module 141 receives input from the battery 142 and/or the charging management module 140, and supplies power to the processor 110, the internal memory 121, an external memory, the display screen 194, the camera 193, the wireless communication module 160, and the like.

In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication bands. Different antennas may be further multiplexed to improve antenna utilization. For example, the antenna 1 may be multiplexed as a diversity antenna of a wireless local area network. In some other embodiments, the antenna may be used in combination with a tuning switch.

The mobile communication module 150 may provide a solution for wireless communication including 2G/3G/4G/5G and the like applied to the electronic device 100. The mobile communication module 150 may include at least one filter, a switch, a power amplifier, a low noise amplifier (low noise amplifier, LNA), and the like. The mobile communication module 150 may receive an electromagnetic wave by using the antenna 1, perform processing such as filtering and amplification on the received electromagnetic wave, and send a processed electromagnetic wave to the modem processor for demodulation. The mobile communication module 150 may further amplify a signal obtained after modulation by the modem processor, and convert an amplified signal into an electromagnetic wave for radiation by using the antenna 1.

The wireless communication module 160 may provide a solution for wireless communication including a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), a near field communication (near field communication, NFC) technology, an infrared (infrared, IR) technology, and the like applied to the electronic device 100. The wireless communication module 160 may be one or more devices integrating at least one communication processing module. The wireless communication module 160 receives an electromagnetic wave by using the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation by using the antenna 2.

In some embodiments, the antenna 1 and the mobile communication module 150 in the electronic device 100 are coupled, and the antenna 2 and the wireless communication module 160 are coupled, so that the electronic device 100 can communicate with a network and another device by using a wireless communication technology.

The electronic device 100 may implement audio functions such as music playing and recording by using the audio module 170, the speaker 170A, the receiver 170B, the microphone 170C, the headset jack 170D, the application processor, and the like.

The audio module 170 is configured to convert a digital audio signal into an analog audio signal for output, and is also configured to convert analog audio input into a digital audio signal. The audio module 170 may be further configured to encode and decode an audio signal. In some embodiments, the audio module 170 may be disposed in the processor 110, or some functional modules in the audio module 170 may be disposed in the processor 110.

The speaker 170A, also referred to as a "loudspeaker", is configured to convert an audio electrical signal into a sound signal. The electronic device 100 may be configured to listen to music or answer a call in a hands-free mode by using the speaker 170A.

The receiver 170B, also referred to as an "earpiece", is configured to convert an audio electrical signal into a sound signal. When a call is answered or audio information is listened to by using the electronic device 100, the receiver 170B may be put close to a human ear to listen to a voice.

The microphone 170C, also referred to as a "mic" or "mike", is configured to convert a sound signal into an electrical signal. When making a call or sending voice information, the user may make a sound by approaching the mouth to the microphone 170C, to input a sound signal to the microphone 170C. At least one microphone 170C may be disposed in the electronic device 100. In some other embodiments, two microphones 170C may be disposed in the electronic device 100, to implement a noise reduction function in addition to listening to voice information. In some other embodiments, three, four, or more microphones 170C may be disposed in the electronic device 100, to collect a sound signal, reduce noise, and identify a sound source, so as to implement a directional recording function and the like.

The headset jack 170D is configured to connect to a wired headset. The headset jack 170D may be a USB interface 130, or may be a 3.5 mm open mobile terminal platform (open mobile terminal platform, OMTP) standard interface, or a cellular telecommunications industry association of the USA (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed on the display screen 194. There are many types of pressure sensors 180A, for example, a resistive pressure sensor, an inductive pressure sensor, and a capacitive pressure sensor. The capacitive pressure sensor may include at least two parallel plates having an electrically conductive material. When force is applied to the pressure sensor 180A, a capacitance between electrodes changes. The electronic device 100 determines strength of pressure based on a change of the capacitance. When a touch operation is performed on the display screen 194, the electronic device 100 detects strength of the touch operation by using the pressure sensor 180A. The electronic device 100 may also calculate a touch position based on a detected signal of the pressure sensor 180A.

The touch sensor 180K is also referred to as a "touch panel". The touch sensor 180K may be disposed on the display screen 194. The touch sensor 180K and the display screen 194 constitute a touchscreen, also referred to as a "touch control screen". The touch sensor 180K is configured to detect a touch operation performed on or near the touch sensor 180K. The touch sensor may transmit the detected touch operation to the application processor, to determine a type of a touch event. Visual output related to the touch operation may be provided by using the display screen 194. In some other embodiments, the touch sensor 180K may alternatively be disposed on a surface of the electronic device 100, and is at a position different from that of the display screen 194.

The ambient light sensor 180L is configured to sense luminance of ambient light. The electronic device 100 may adaptively adjust luminance of the display screen 194 based on the sensed luminance of the ambient light. The ambient light sensor 180L may also be configured to automatically adjust white balance during photographing. The ambient light sensor 180L may further cooperate with an optical proximity sensor 180G to detect whether the electronic device 100 is in a pocket to prevent accidental touch.

The button 190 includes a power button, a volume button, and the like. The button 190 may be a mechanical button, or may be a touch button. The electronic device 100 may receive key input and generate key signal input related to user settings and function control of the electronic device 100.

The motor 191 may generate a vibration prompt. The motor 191 may be configured to provide a vibration prompt for an incoming call, and may also be configured to provide vibration feedback for touch.

The display screen 194 is configured to display an image, a video, and the like. In some embodiments, the electronic device 100 may include one or N display screens 194, where N is a positive integer greater than 1.

The camera 193 is configured to capture a still image or video. In some embodiments, the electronic device 100 may include one or N cameras 193, where N is a positive integer greater than 1.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1.

In the embodiments of this application, a specific structure of an execution entity of a task scheduling method is not specifically limited, provided that code in which the task scheduling method provided in the embodiments of this application is recorded can be run to perform communication based on the task scheduling method provided in the embodiments of this application. For example, the execution entity of the task scheduling method provided in the embodiments of this application may be a functional module that is in an electronic device and that can invoke a program and execute the program, or a processing apparatus applied to the electronic device, for example, a chip.

The electronic device shown in FIG. 1 may provide various functions, and the function provided by the electronic device needs to be implemented by processing one or more tasks by a processor in the electronic device. One task may be one process, and one process may include one or more threads. In actual application, a plurality of threads may be packetized into one process. Therefore, a subtask of a task may be a thread.

When the processor processes a task, if the task is complex, and the processor cannot quickly process the task, system lag is caused, and user experience is poor.

Figure 2:
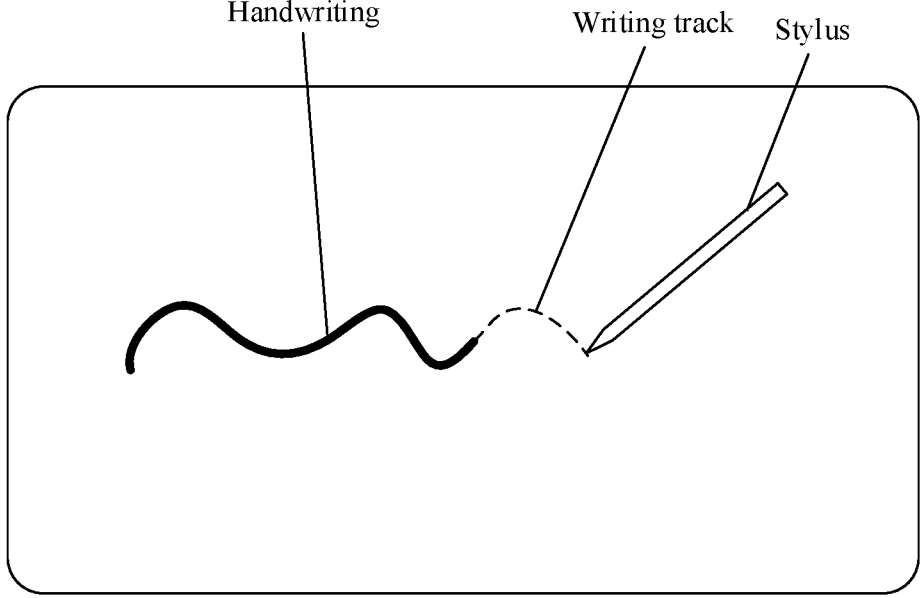
FIG. 2 is a diagram of an application scenario of a task scheduling method according to an embodiment of this application.
Figure 3:
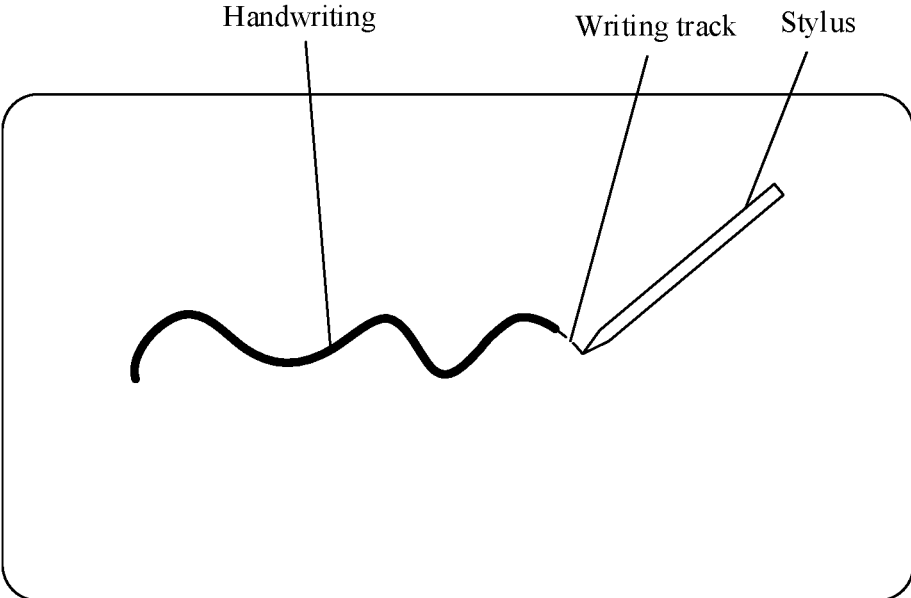
FIG. 3 is a diagram of an application scenario of a task scheduling method according to an embodiment of this application.

Scenarios shown in FIG. 2 and FIG. 3 are used as an example. In a process in which a user performs writing by using a stylus function in a Notepad application of a tablet computer, the tablet computer needs to quickly respond to display handwriting of the stylus in a writing interface of the Notepad. Implementation of the function relates to tasks such as drawing, rendering, composition, and display.

Referring to FIG. 2, if time for processing the foregoing task by a processor of the tablet computer is long, the drawing, rendering, and composition tasks may not be completed in one refresh period, and the tablet computer cannot display an image that should be displayed. Consequently, system frame loss and lag are caused. Correspondingly, a delay from generating a writing track in the writing interface by the user by using the stylus to displaying handwriting on the writing track is long, the stylus function of the tablet computer is slow, and hand-following experience of the stylus of the user is poor.

Referring to FIG. 3, if processing time for processing the foregoing task by the processor of the tablet computer is short, it is sufficient to complete the drawing, rendering, and composition tasks in one refresh period, the tablet computer may display a corresponding image at a proper time, and the system is smooth. Correspondingly, a delay from generating a writing track in the writing interface by the user by using the stylus to displaying handwriting on the writing track is short, the stylus function of the tablet computer is smooth, and hand-following experience of the stylus of the user is good.

The task scheduling method provided in the embodiments of this application may be applied to the application scenarios shown in FIG. 2 and FIG. 3, and may be further applied to any scenario that has a high delay requirement.

In another scenario example, during multi-screen interaction (for example, interaction between a tablet computer and a mobile phone, or interaction between a mobile phone and a large screen), for an operation performed on an electronic device, a response to the operation needs to be presented on another electronic device in a timely manner. Therefore, a delay requirement is high. Examples of other application scenarios are not provided one by one.

To shorten time for processing a specific task by the processor, a manner such as increasing a working frequency of a CPU core on which the specific task runs may be used. However, power consumption of the electronic device is excessively high in this manner. The CPU core in the embodiments of this application may be a CPU core, and is a core unit on a physical CPU chip.

The time for processing the specific task may alternatively be shortened by setting a priority of the specific task.

However, the CPU core that processes the specific task may further process another task. If the specific task is preferentially processed, the CPU core may be impeded from processing the another task.

Therefore, a task scheduling manner is required to shorten processing time of a task without affecting processing of another task. After processing of the task ends, the system can be further restored to an initial state of the task, to avoid a problem of excessively high power consumption of the electronic device.

To resolve the foregoing problem, an embodiment of this application provides a task scheduling method. In the task scheduling method, when some tasks in a specific scenario are run in the specific scenario, the task is switched from an original CPU core (a CPU core in which the task is currently located) to a new CPU core (a CPU core with a higher computing capability) for running, to avoid a problem that the original CPU core is impeded from processing various tasks because a capability of the original CPU core is insufficient to support fast execution of the task. In addition, after the specific scenario ends, the task may be switched back to the original CPU core for running, so that a problem of excessively high power consumption of the electronic device can also be avoided.

To facilitate a better understanding of the task scheduling method provided in this embodiment of this application, the following specifically describes the task scheduling method.

Step 1: A developer presets a scenario that supports task scheduling (for example, a scenario that has a high delay requirement), and configures a CPU core for the scenario that supports task scheduling, where the configured CPU core is bound to a process in the scenario that supports task scheduling. The configured CPU core may be denoted as a configuration core. In actual application, some threads (or all threads) of the process may be configured to run on the configuration core. Configuration information in this step may be stored in a memory of an electronic device in a form of a configuration file.

Step 2: When the electronic device is in the scenario that supports task scheduling, the electronic device obtains, from the configuration file, each thread that is in each process in the scenario that supports task scheduling and that participates in core binding, and a configuration core of each thread.

Step 3: The electronic device checks whether each thread that participates in core binding is currently in a running state.

Because a thread may not be a thread dedicated to a scenario, when it is determined that the electronic device is currently in a specific scenario and the thread is in a running state, the thread that is currently in a running state is switched from a core, on which the thread currently runs, to the configuration core for running.

Step 4: The electronic device checks a group running core of a CPU group in which a thread that participates in core binding and that is currently in a running state is located.

The group running core of the CPU group in which the thread is located specifies that the thread may run on any CPU core in the group running core. If a group running core of a thread is a small core (a core 1 and a core 3) of a CPU, the thread can run only on the core 1 and the core 3 in the group running core. That is, a CPU core on which the thread is allowed to run includes each CPU core in a group running core of a CPU group in which the thread is located.

A CPU group in which a thread is located is managed by a CGroup (control Group) virtual file system. A plurality of control groups are set in the virtual file system, and each control group is a group of tasks obtained through division based on some standards. A task may be added to a control group, or may be migrated from a control group to another control group. The control group limits a specific CPU core on which a task belonging to the control group can run. The control group may be understood as a CPU group in this embodiment of this application, and the CPU core limited by the control group may be understood as a group running core in this embodiment of this application.

Step 5: If the group running core of the CPU group in which the thread that participates in core binding and that is in the running state is located includes a configuration core of the thread, the electronic device switches the thread to the configuration core for running.

Certainly, after determining that the scenario ends, the electronic device needs to switch the thread, that is switched to the configuration core for running, back to the group running core of the CPU group in which the thread is located for running.

Step 6: If the group running core of the CPU group in which the thread that participates in core binding and that is in the running state is located does not include a configuration core of the thread, the electronic device caches initial state information of the thread, for example, a CPU group in which the thread is currently located, where the initial state information may further include a group running core of the CPU group in which the thread is currently located. Then, the electronic device switches the thread to a root group, and a thread in the root group may run on a plurality of cores (for example, a core 0 to a core 7 in an 8-core processor) of a processor. In this case, a group running core of a thread in the root group includes a configuration core, and the electronic device may switch the thread, that participates in core binding and that is in the root group, to the configuration core for running.

To improve a processing speed of the thread, the configuration core may be a large core (for example, a core 6) of the CPU. If a group running core of a CPU group in which the thread is originally located is a small core (for example, a core 1 and a core 3) of the CPU, the group running core of the thread may not include a configuration core, and the thread needs to be switched from the original CPU group to the root group, so that the thread in the root group can be switched to the configuration core for running.

Certainly, after determining that the scenario ends, the electronic device obtains the cached initial state information of the thread, and switches the thread from the root group back to the original CPU group based on the initial state information of the thread. After the thread is switched from the root group back to the original CPU group, the thread naturally returns to run on the group running core of the original CPU group.

Figure 4:
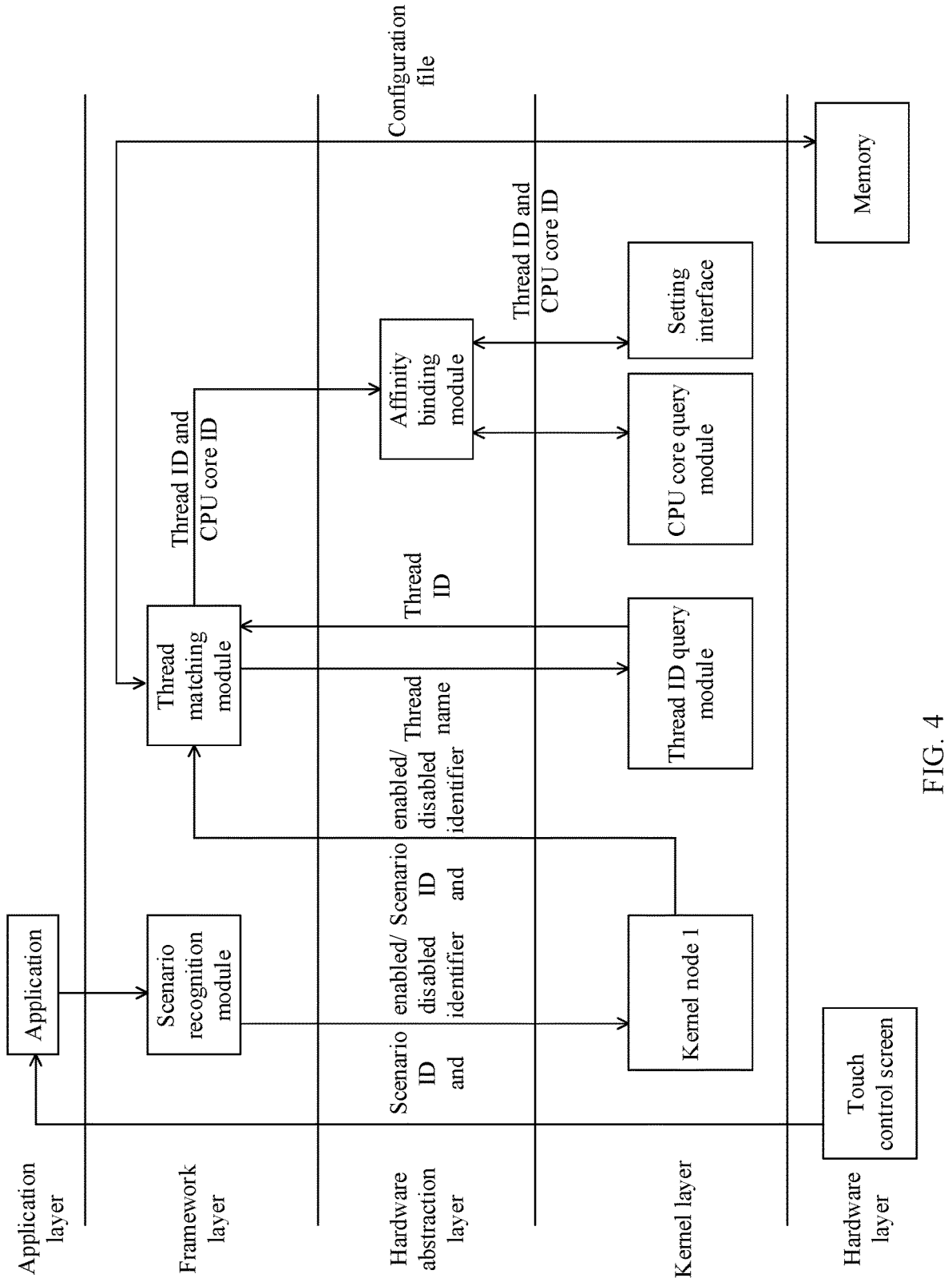
FIG. 4 is a diagram of a technical architecture on which a task scheduling method depends according to an embodiment of this application.

After the foregoing task scheduling method is described, an implementation of the task scheduling method provided in this embodiment of this application is described in detail. FIG. 4 shows a technical architecture on which a task scheduling method depends according to an embodiment of this application. It should be noted that the technical architecture is an implementation of the foregoing task scheduling method, and it does not mean that the task scheduling method can be implemented only by using the technical architecture shown in FIG. 4. For example, modules (or kernel nodes) with different names in the technical architecture shown in FIG. 4 may be combined into a same module (or a kernel node). One module (or a memory) in the technical architecture shown in FIG. 4 may be further divided into a plurality of modules (or a plurality of storage spaces).

The technical architecture includes an application (Application) layer, a framework (Framework) layer, a hardware abstraction layer (Native& Hardware Abstraction Layer), a kernel (Kernel) layer, and a hardware (Hardware) layer.

The application layer includes various applications, for example, the Notepad application and the multi-screen interaction application (not shown in FIG. 4) in the foregoing scenario. The Notepad application may provide a stylus function.

The framework layer includes a scenario recognition module and a thread matching module. The scenario recognition module is configured to recognize whether a current scenario is a preset scenario (for example, a stylus scenario of the Notepad) that supports task scheduling and whether the current scenario belongs to scenario enabled or scenario disabled, to obtain a scenario ID and an enabled identifier (or a disabled identifier). The thread matching module is configured to parse the configuration file in the foregoing embodiment to obtain the parsing information. When the scenario recognition module determines that the current scenario is a scenario that supports task scheduling, the thread matching module may further search the parsing information for a process name that matches the current scenario, a configuration core ID (a configured CPU core ID) of the process, and a thread name that is in the process and that participates in core binding. The thread matching module may further determine whether a thread obtained from the parsing information through matching is currently in a running state.

The hardware abstraction layer includes a core binding module. The core binding module may be used as a communication interface between the thread matching module at the framework layer and a setting interface at the kernel layer. In an example, the core binding module may receive a thread ID and a configuration core ID (a configured CPU core ID) from the thread matching module, and may further invoke the setting interface to successively set a running core of each thread received from the thread matching module. The core binding module may further implement some processing operations before core binding, for example, the operation of caching the initial state information of the thread and the operation of switching the CPU group of the thread in step 6 in the foregoing embodiment.

The kernel layer includes a kernel node 1, a thread ID query module (which may be located in a kernel node 2), a CPU core query module (which may be located in a kernel node 3), and a setting interface. The kernel node 1 (for example, a sys/kernel/sched/curr_scene node) is configured to store a scenario ID of the scenario that is recognized by the scenario recognition module and that supports task scheduling and an identifier indicating whether the current scenario is enabled or disabled. The thread ID query module in the kernel node 2 is configured to store related information such as a process currently running in the system and a thread in the process. For example, the thread ID query module may be a proc file system. A thread ID corresponding to a thread name may be obtained by querying the proc file system. The CPU core query module in the kernel node 3 is configured to store information such as a CPU group in which a thread is located and a group running core of the CPU group. For example, the CPU core query module may be a CGroup virtual file system. The setting interface (for example, a CPU affinity function sched_setaffinity( )) may be used to switch a thread from a current running core to a configuration core for running, and may be further used to switch, for running, the thread from the configuration core to a group running core of a CPU group in which the thread is located.

The hardware layer includes a touch control screen and a memory. A database is set in the memory, and is used to store a related file (for example, a configuration file) and data (for example, some cached information) that are used in the task scheduling method provided in this embodiment of this application. The touch control screen is configured to detect a stylus operation of a user in the application scenarios shown in FIG. 2 and FIG. 3.

Certainly, when the task scheduling method provided in this embodiment of this application is applied to another application scenario, the task scheduling method may not depend on the Notepad at the application layer and the touch control screen at the hardware layer.

After the technical architecture shown in FIG. 4 is described, how to implement the task scheduling method, provided in this embodiment of this application, by using the modules in the technical architecture shown in FIG. 4 is described in detail by using the accompanying drawings shown in FIG. 5A to FIG. 11C.

Preparation Work:

Step A1: A developer compiles and compiles a configuration file, where the configuration file is stored in a database in a memory of an electronic device.

Referring to Table 1, in a stylus scenario (the scenario ID may be set to 0) of Notepad, a configuration core is set for a process android.hardware.graphics.composer@2.1-service in the scenario, an identifier corresponding to the configuration core may be denoted as a configuration core ID (a configured CPU core ID), the configuration core ID of the process is 11000000, and a configuration core (a configuration core ID is 11000000) is set for a process surfaceflinger in the scenario. A thread overlayengine_0 in the process android.hardware.graphics.composer@2.1-service runs on the configuration core of the process, and a thread surfaceflinger in the process surfaceflinger runs on the configuration core of the process.

TABLE 1

| To-be-compiled configuration information | | | |
|---|---|---|---|
| Scenario ID | Process name | Config-uration core ID | Thread name |
| 0 | android.hardware.graph-ics.composer@2.1-service | 11000000 | overlayengine_o |
| | surfaceflinger | 11000000 | surfaceflinger |

The following configuration file may be obtained based on content in Table 1:

```
<config name="sub_switch">
<item type="switch">
<cpu_affinity bit="23">1</cpu_affinity>
</item>
</config>
<config name="cpu_affinity_list">
<item process_name="android.hardware.graphics.composer@2.1-service"
mask="11000000" index="0">
<thread_name>overlayengine_0</thread_name>
</item>
<item process_name="surfaceflinger" mask="11000000" index="0">
<thread_name>surfaceflinger</thread_name>
</item>
</config>
```

An identifier for enabling a task scheduling function and an identifier for disabling the task scheduling function are defined in the configuration file.

In an example, the identifier for enabling the task scheduling function may be "1," and the identifier for disabling the task scheduling function may be "0." In actual application, another character may be used as the identifier for enabling the task scheduling function and the identifier for disabling the task scheduling function. Examples are not provided one by one.

A scenario identifier (scenario ID) is further defined in the configuration file, and a configuration core is defined for each scenario in a dimension of process. When a scenario relates to a plurality of processes, the plurality of processes and a configuration core of each process may be set based on the scenario ID.

Certainly, each process may further include a plurality of threads. If some threads in the process require a high processing speed, a specific thread that is in the process and that participates in core binding may be further defined in the configuration file. Certainly, in the configuration file, a same configuration core may be set for a plurality of threads that are in a same process and that participate in core binding.

In an example of the foregoing configuration file, 1 in <cpu_affinity bit="23">1</cpu_affinity> indicates that the task scheduling function is enabled. When 1 is replaced with 0, it indicates that the task scheduling function is disabled.

An index value in cpu_affinity_list may be understood as the scenario ID.

In another example, a plurality of bits may be set in a kernel node to store a scenario identifier (scenario ID) and an enabled/disabled identifier. The index value may represent a subscript of a corresponding bit in the kernel node. For example, 8 bits may be used to store the enabled/disabled identifier and the scenario identifier, that is, a bit [0] to a bit [7] in the 8 bits are bits that are set in this embodiment of this application, that are in a kernel node 1, and that indicate the scenario that supports task scheduling. When the scenario ID is i ($0 \le i \le 7$), it indicates a specific bit that is in a bit [i] into which the scenario enabled/disabled identifier is written and that stores data, where the data indicates that a currently recognized scenario is a scenario corresponding to a sub-script of a specific bit.

Certainly, in actual application, the scenario ID and the enabled/disabled identifier may be stored in the kernel node 1 in another manner. For example, data written into the kernel node each time may be set to 4 bits, where the 0th bit is an enabled/disabled identifier (0 or 1), and the 1st bit, the 2nd bit, and the 3rd bit cooperate to be used as eight scenario identifiers (000, 001, 010, 011, 100, 101, 110, 111). Correspondingly, the index value in the configuration file needs to be consistent with an ID that is used to represent a same scenario when the scenario ID is stored.

A specific implementation in which the kernel node 1 stores the scenario ID and the enabled/disabled identifier is not limited in this embodiment of this application. Regardless of a manner used, the scenario ID in the configuration file needs to be consistent with a written ID used to represent the same scenario.

As described above, a plurality of threads may need to participate in core binding in a same scenario, and a same index value represents a same scenario. Therefore, a plurality of processes and a plurality of threads in a scenario may be configured by using a same index value.

In the foregoing example, process_name represents a process name that is set in a scenario, mask represents a CPU core ID that is set for each process when the scenario is enabled, and thread_name represents a thread name that participates in core binding in the scenario.

In the foregoing configuration file, two processes are configured. For details, refer to the process android.hardware.graphics.composer@2.1-service and the process surfaceflinger in the configuration file.

The thread overlayengine_0 in the process android.hardware.graphics.composer@2.1-service is bound to a CPU core whose identifier is 11000000. The thread surfaceflinger in the process surfaceflinger is bound to a CPU core with whose identifier is 11000000.

In this embodiment of this application, an example in which the electronic device has eight CPU cores is used. An 8-bit identifier (XXXXXXXX) may be set. In an example, counting from right to left, if an $i^{th}$ bit is 1, it indicates that a thread may run on an $i^{th}$ CPU core, where i is eight natural numbers from 0 to 7. If a configuration core identifier that is set in the configuration file is 11000000, it indicates that the set CPU cores are the sixth CPU core and the seventh CPU core, and a CPU core sequence number of each CPU core may be predefined. One or more CPU cores may be configured in this embodiment of this application. In another example, an identifier "11111111" may be used to represent all eight CPU cores in the electronic device.

Certainly, when one process includes a plurality of threads, and at least two threads in the process need to run on a configuration core, all the plurality of threads in the process may be set to be bound to the configuration core of the process.

In this embodiment of this application, the scenario identifier configured in the configuration file may be denoted as a first scenario identifier. Any thread configured for the first scenario identifier in the configuration file may be denoted as a first thread. If the Notepad application is used as an example, the configured first thread may be any thread on which a stylus function provided by the Notepad application depends. For example, the thread is used for display processing when the stylus function is used to perform handwriting, for example, drawing processing, rendering processing, and composition processing. Certainly, the Notepad application may be denoted as a first application, and the first application may further be any application that supports task scheduling. In this embodiment of this application, a CPU core configured for the first thread is denoted as a third CPU core set.

Steps after the electronic device is powered on or restarted are as follows:

Step B1: After a user powers on the electronic device or restarts the electronic device, the electronic device is powered on.

Step B2: After the electronic device is powered on, a thread matching module is started.

Step B3: After being started, the thread matching module sends a configuration file read request to the database in the memory.

In this step, the thread matching module does not obtain all configuration files in the electronic device, but obtains a configuration file related to the thread matching module, for example, a configuration file related to the task scheduling function.

Step B4: The thread matching module reads a configuration file from the database in the memory.

Step B5: The thread matching module parses the configuration file to obtain parsing information.

After parsing the configuration file, the thread matching module obtains parsing information in a format shown in Table 2. In Table 2, index is a scenario ID, procName is a process name on which core binding needs to be performed when a current scenario ID is enabled, cpumask is a CPU core ID to which a corresponding process needs to be bound, and Threadname is a thread name that is in the corresponding process and that needs to participate in core binding.

TABLE 2

| Parsing information of a configuration file | | | |
|---|---|---|---|
| Scenario identifier | Process name | CPU core identifier | Thread name |
| <string>index | procName1 | cpumask1 | Threadname1-1 Threadname1-2 . . . |
| | procName2 | cpumask2 | Threadname2-1 Threadname2-2 . . . |

Corresponding to the configuration file in step A1, parsing information shown in Table 3 may be obtained.

TABLE 3

| Parsing information of a configuration file | | | |
|---|---|---|---|
| Scenario identifier | Process name | CPU core identifier | Thread name |
| 0 | android.hardware.graphics.composer@2.1-service | 11000000 | overlayengine_o |
| | surfaceflinger | 11000000 | surfaceflinger |

After step B5, the thread matching module obtains the parsing information, and the parsing information is stored in a map storage manner. The Map storage manner is a data storage manner implemented in a manner of an array and a linked list. In this storage manner, search efficiency can be improved. Therefore, when a scenario meeting a condition is triggered to implement the task scheduling function, the thread matching module can quickly obtain, through matching, a process name in which a thread that needs to be scheduled in a current scenario is located, a configuration core ID corresponding to the process, and a thread name that is in the process and that participates in core binding. The parsing information stored in the map storage manner may be stored in an internal memory.

It should be noted that, after the electronic device is powered on, the thread matching module obtains the configuration file, parses the configuration file to obtain the parsing information, and stores the parsing information in the map form. After receiving a scenario ID sent by a scenario recognition module, the thread matching module may search the parsing information stored in the map manner for configuration information (for example, information such as a process name, a configured CPU core identifier, and a thread name) corresponding to the scenario ID, so that a search speed can be improved.

In actual application, the thread matching module may perform step B3 to step B5 after receiving the scenario ID sent by the scenario recognition module, to obtain the parsing information, and then search the parsing information for the configuration information corresponding to the scenario ID.

Steps existing when the scenario meeting a condition is triggered are as follows:

Step C1: The user enables the Notepad application on the electronic device.

Step C2: The scenario recognition module detects that the Notepad application is switched to foreground for running.

Step C3: The user starts a handwriting operation by using a stylus in a handwriting interface of the Notepad application displayed on a touch control screen of the electronic device.

Step C4: The touch control screen sends detected touch control information to an upper-layer application (for example, the Notepad application).

The touch control screen may detect information (for example, a position) related to the stylus operation. The touch control screen transmits, to the upper-layer application, related information recording the position of the stylus operation. The system may determine, based on the position of the stylus operation, that the stylus operation is performed in the handwriting interface of the Notepad application. When it is determined, based on the position of the stylus operation, that the stylus operation is performed in the handwriting interface of the Notepad application, the Notepad application may detect a handwriting operation of the stylus.

Step C5: The Notepad application sends the handwriting operation of the stylus to the scenario recognition module.

When the user enables the Notepad, and uses the stylus function of the Notepad, each time the Notepad is enabled or is switched from background to foreground, when the stylus is in contact with the touch control screen in a range of the handwriting interface for the first time, the scenario recognition module detects the handwriting operation of the stylus for the first time. That is, the electronic device receives first input of the stylus in an interface of the first application.

Certainly, if the user exits the stylus operation (for example, the user taps the handwriting interface by using a finger) in a process of performing a handwriting operation by using the stylus, after the user exits the stylus operation, when the stylus is in contact with the touch control screen in a range of the handwriting interface for the first time, the scenario recognition module detects the handwriting operation of the stylus for the first time. That is, after the electronic device receives an operation of touching the handwriting interface of the Notepad application by the user, when the stylus is in contact with the touch control screen in the range of the handwriting interface for the first time, the electronic device also receives the first input of the stylus in the interface of the first application.

Based on the foregoing descriptions, it may be understood that, after the Notepad is enabled or is switched from background to foreground, when the stylus is in contact with the touch control screen in the range of the handwriting interface for the first time, the scenario recognition module detects the handwriting operation of the stylus for the first time. After the stylus scenario exits (for example, the user touches the touch control screen in the range of the handwriting interface of the Notepad by using the finger), when the stylus is in contact with the touch control screen in the range of the handwriting interface for the first time, the scenario recognition module detects the handwriting operation of the stylus for the first time.

Step C6: The scenario recognition module determines a scenario ID of a current scenario (certainly, the scenario may be defined as a stylus scenario, and the scenario ID may be a predefined stylus scenario ID) and an enabled identifier based on the detected case in which the Notepad application is switched to foreground for running and the handwriting operation that is of the stylus and that is detected for the first time (which may also be understood as entering the stylus scenario from another scenario).

It should be noted that, in this embodiment of this application, a condition "the Notepad is switched to foreground for running" and a condition "the stylus scenario is entered from a non-stylus scenario" are used as conditions for enabling the stylus scenario of the Notepad.

In actual application, the scenario recognition module may further add another condition as the condition for enabling the stylus scenario of the Notepad, for example, whether the electronic device is currently in a single-frame mode. The single-frame mode is a mode in which drawing, rendering, composition, and displaying described above are completed in one refresh period, that is, a mode in which the electronic device sends a composited handwriting image to a display screen for display while compositing the handwriting image, so that the image can be quickly displayed on the display screen of the electronic device.

Step C7: The scenario recognition module writes the enabled identifier and the scenario ID into the kernel node 1.

Step C8: After detecting the write operation, the kernel node 1 sends the written data (the enabled identifier and the scenario ID) to the thread matching module.

In actual application, the scenario recognition module may alternatively send the scenario ID and the enabled identifier to the thread matching module. Whether the scenario recognition module sends the scenario ID and the enabled identifier to the thread matching module by using the kernel node is not limited in this embodiment of this application.

In addition, to avoid repeated triggering of step C8 and subsequent steps, the following logical content may be set in the kernel node 1: When the scenario ID and the enabled identifier are written into the kernel node 1, if the kernel node 1 receives again a same scenario ID and an enabled identifier that are sent by the scenario recognition module, the kernel node 1 no longer sends the newly received scenario ID and enabled identifier to the thread matching module.

If the foregoing logic exists in the kernel node 1, after the Notepad application runs in foreground, and the handwriting operation of the stylus in the handwriting interface is detected, the scenario recognition module may determine that the scenario ID is an ID of the stylus scenario and an enabled identifier. A specific manner is not limited in this embodiment of this application.

Certainly, when the scenario ID and the enabled identifier are written into the kernel node 1, if the kernel node 1 receives again a same scenario ID and a disabled identifier that are sent by the scenario recognition module, the kernel node 1 sends the newly received scenario ID and disabled identifier to the thread matching module. For details, refer to descriptions in subsequent embodiments shown in FIG. 10A to FIG. 10C and FIG. 11A to FIG. 11C.

Certainly, when the scenario recognition module does not send the scenario ID and the enabled identifier to the thread matching module by using the kernel node 1, the foregoing logic may alternatively be set in the scenario recognition module.

Step C9: After receiving the enabled identifier and the scenario ID that are sent by the kernel node 1, the thread matching module searches the parsing information (map storage structure) of the configuration file for a process name, a configuration core ID, and a thread name that match the scenario ID. In an example, information obtained by the thread matching module through matching is as follows:

a process A, a core 6, and a thread 1;

a process B, a core 6, and a thread 2; and a process C, a core 6, and a thread 3.

Step C10: The thread matching module determines, by searching a thread ID query module, whether the process (the process A, the process B, and the process C) obtained from the parsing information through matching and the thread (the thread 1, the thread 2, and the thread 3) that is in the process and that is obtained through matching exist.

In this embodiment of this application, the thread ID query module stores a proc file system (which may be denoted as a first file system). The proc file system is a process data file system. The proc file system stores a currently running thread and a process in which the currently running thread is located (or a currently running process and a currently running thread in the process). After running of a thread ends, a directory corresponding to the thread in the proc file system disappears. If a corresponding thread can be obtained by searching the proc file, it indicates that the thread is currently in a running state.

Only the currently running thread is switched from a current running core to a configuration core for running. Therefore, the thread matching module needs to perform step C10 to determine, by searching the proc file system, whether the thread obtained from the configuration information through matching is currently in a running state, and when the thread is in the running state, switch the thread in the running state to the configuration core for running.

In addition, when the proc file system is searched for a thread that participates in core binding, the proc file needs to be first searched for a directory of a process in which the thread that participates in core binding is located. Then, based on the found directory of the process in the proc file system, the directory of the process is further searched for the thread. Therefore, although a configuration core is set for a thread when the configuration core is set in this embodiment of this application, a process in which the thread is located needs to be configured in the configuration file. In this way, a corresponding thread can be obtained by searching the proc file system based on a process in which the thread is located.

Step C11: The thread matching module obtains, by querying the proc file system, a thread ID (tid1) of the thread 1 in the process A and a thread ID (tid2) of the thread 2 in the process B.

If the thread matching module does not obtain the thread 3 in the process C by querying the proc file system, it indicates that the thread 3 in the process C currently does not run, and the thread 3 in the process C does not need to be switched to the configuration core for running.

In addition, it should be noted that the thread matching module sends a process name and a thread name to the proc file system, and the thread ID query module returns a thread ID (such as tid1 or tid2). In this way, the configuration core can be set in a form of a thread ID when the configuration core is set in a subsequent step.

Step C12: The thread matching module sends, to a core binding module, tid1 and tid2 that are obtained by querying the proc file system and the CPU core ID obtained by querying the parsing information.

The thread matching module packetizes the thread ID and the configuration core ID, and sends a data packet to the core binding module. For the sent data packet, refer to Table 4. Certainly, when a plurality of threads have a same configuration core ID, the plurality of threads may be packetized and sent based on Table 4. When a plurality of threads have different CPU core IDs, the plurality of threads need to be separately sent.

TABLE 4

| Data packet sent by a thread matching<br>module to a core binding module |
| --- |
| tid1 |
| tid2 |
| CPU core ID |

Step C13: After receiving the data sent by the thread matching module, the core binding module successively obtains each thread ID, and successively sends, to a setting interface, each thread ID and the CPU core ID received from the thread matching module.

In an example, the core binding module first sends tid1 and a configuration core ID (which is a CPU core ID received from the thread matching module) to the setting interface.

After receiving tid1 and the configuration core ID from the thread matching module, the setting interface sets the thread 1 to be switched to the configuration core for running.

An example is as follows:

Step C14: The setting interface sends the received thread ID (tid1) to a CGroup virtual file system stored in a CPU core query module, to request the CGroup virtual file system to return a CPU core ID that is set for a CPU group in which the thread ID is located. The CPU core ID represents the group running core in the foregoing embodiment.

Step C15: The CPU core query module returns an identifier corresponding to a group running core that is set for the CPU group in which tid1 is located.

Step C16: If there is an intersection set between the CPU core represented by the configuration core ID corresponding to tid1 and the group running core corresponding to tid1, a running core of the thread 1 represented by tid1 may be set as a CPU core in the intersection set.

In this embodiment of this application, the CPU group in which the thread 1 is located may have one or more group running cores, and there may be one or more CPU cores represented by the configuration core ID. If at least one CPU core in the configuration core is a CPU core in the group running core, the setting may succeed. It may also be understood that, when there is an intersection set between the CPU core represented by the configuration core ID and the CPU core represented by the group running core ID, the setting may succeed. After the setting succeeds, the thread 1 represented by tid1 may run on any CPU core in a CPU core in the intersection set.

In an example, CPU cores configured for the thread 1 are a core 1 and a core 3. Group running cores of the CPU group in which the thread 1 is located are a core 0 to the core 3. An intersection set between the configured CPU cores and the group running cores is the core 1 and the core 3. In this case, after the setting succeeds, the thread 1 may run on the core 1, or may run on the core 3.

Step C17: After setting the thread 1 to run on one CPU core in the configured CPU core, the setting interface returns, to the core binding module, a message used to indicate that the setting of the configuration core of tid1 succeeds.

After the thread 1 is set to the configuration core, the thread 1 runs on the configuration core.

Step C18: The core binding module continues to send tid2 and a configuration core ID (which is a configuration core ID corresponding to tid2) to the setting interface.

After receiving tid2 and the configuration core ID, the setting interface sets the thread 2 to be switched to the configuration core for running.

Step C19: The setting interface sends the received thread ID (tid2) to the CGroup virtual file system stored in the CPU core query module, to request the CGroup virtual file system to return a CPU core ID that is set for a CPU group in which the thread ID is located. The CPU core ID represents the group running core in the foregoing embodiment.

Step C20: The CPU core query module returns an identifier corresponding to a group running core that is set for the CPU group in which tid2 is located.

Step C21: If there is an intersection set between the CPU core represented by the configuration core ID corresponding to tid2 and the group running core corresponding to tid2, a running core of the thread 2 represented by tid2 may be set as a CPU core in the intersection set.

For a step in which the setting interface sets tid2 to run on the configuration core, refer to the step in which the setting interface sets tid1 to run on the configuration core. Details are not described herein again.

Step C22: After setting the thread 2 to run on one CPU core in the configured CPU core, the setting interface returns, to the core binding module, a message used to indicate that the setting of the configuration core of tid2 succeeds.

After the thread 2 is set to the configuration core, the thread 2 runs on the configuration core.

As described above, due to a limitation imposed by a group running core of a CPU group in which a thread is located, the thread can run only on a CPU core in the group running core. If a group running core of a thread does not include any set configuration core, when the setting interface sets the thread to run on the configuration core, the setting fails.

In an example, if the group running core of the CPU group in which the thread 2 is located is a small core (for example, a core 1 and a core 3) of the CPU, a limitation that the thread 2 needs to run on the small core (for example, the core 1 and the core 3) of the CPU is imposed. When the configuration core that is in the configuration file and that is set for the thread 2 is a large core (for example, a core 6) of the CPU, and the setting interface sets the thread 2 to run from a CPU core on which the thread currently runs to the configuration core, the setting may fail.

Figure 6A:
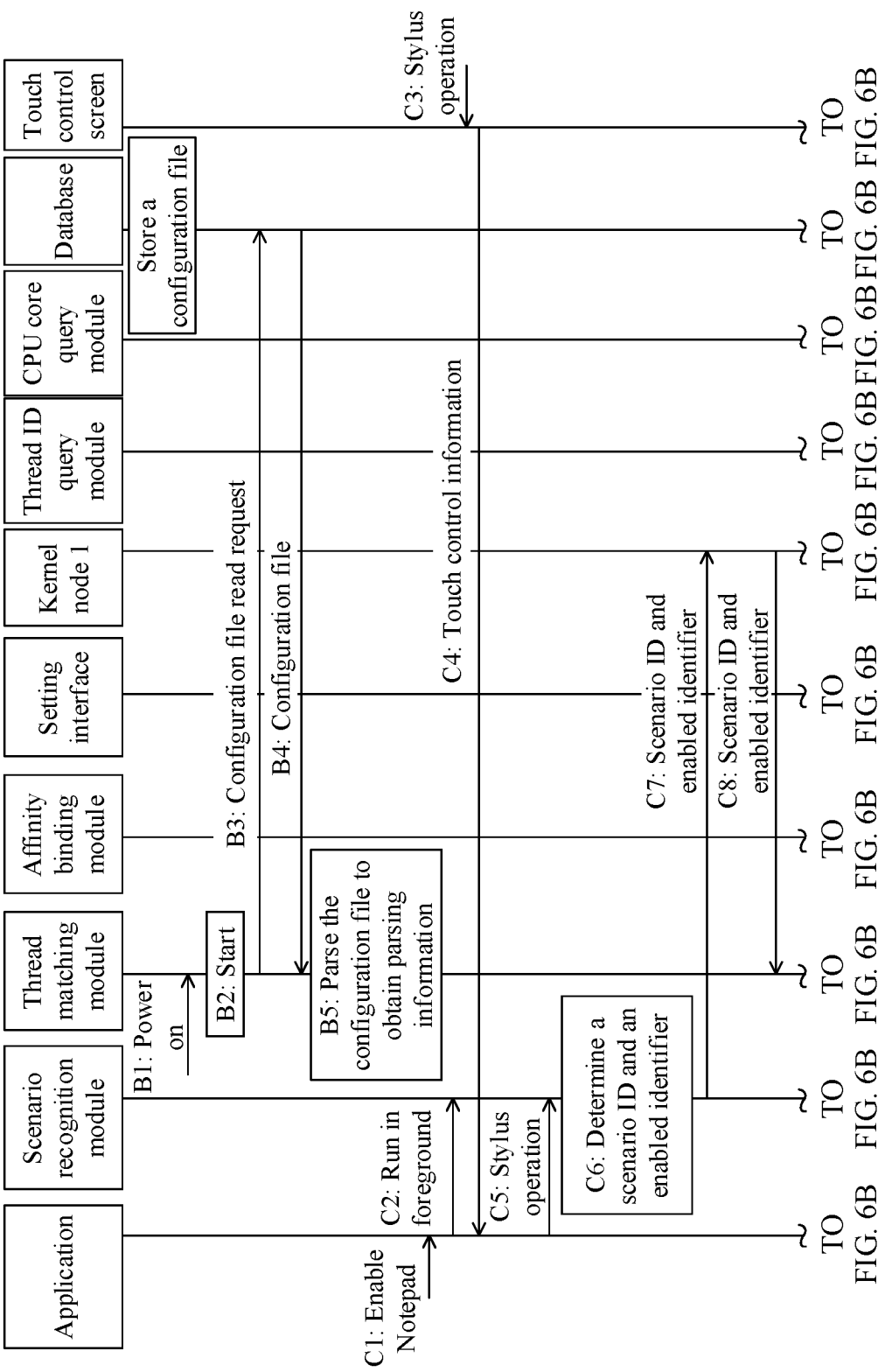
FIG. 6A to FIG. 6C are another sequence diagram of a task scheduling method when a scenario is enabled according to an embodiment of this application.
Figure 6B:
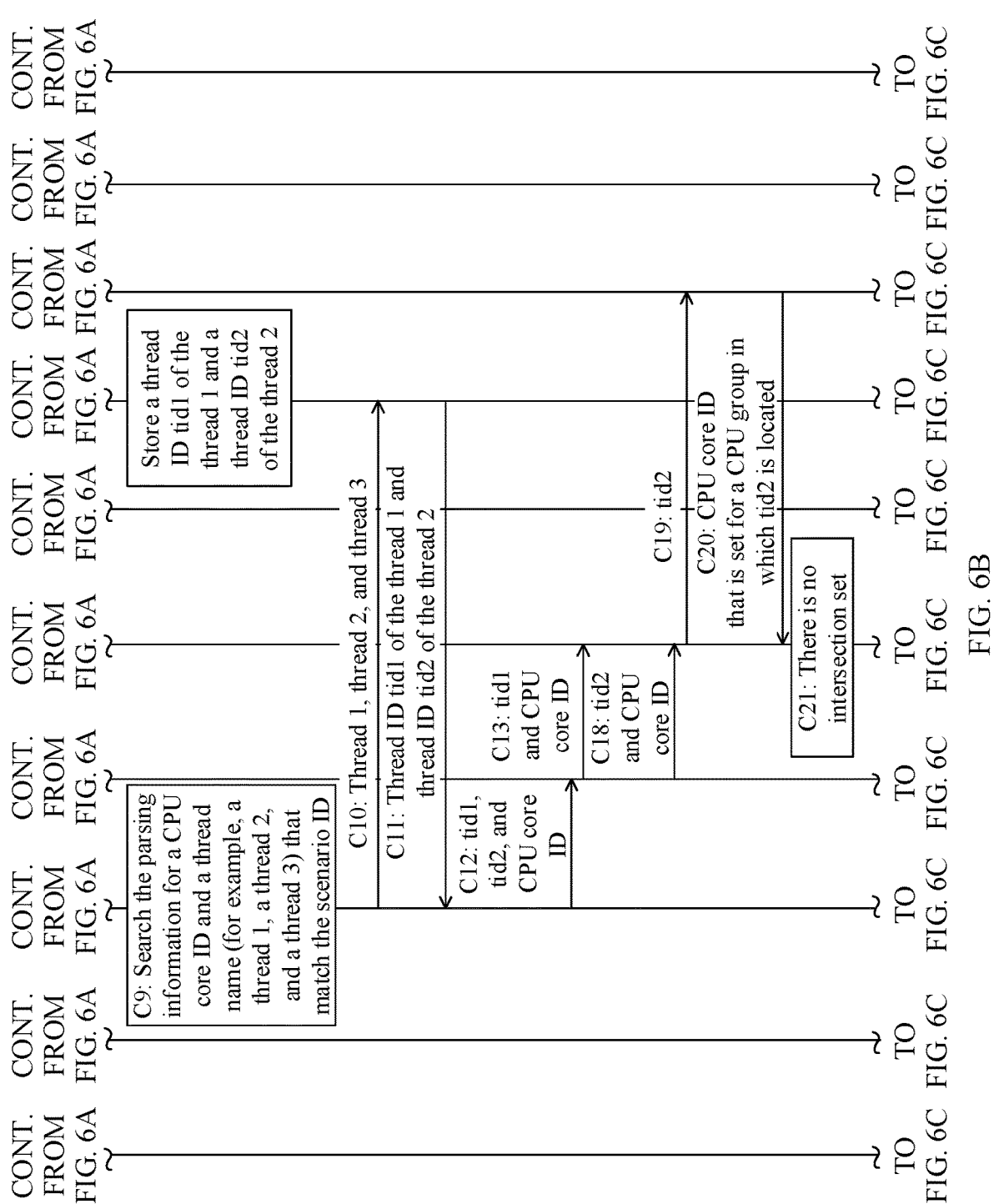
Figure 6C:
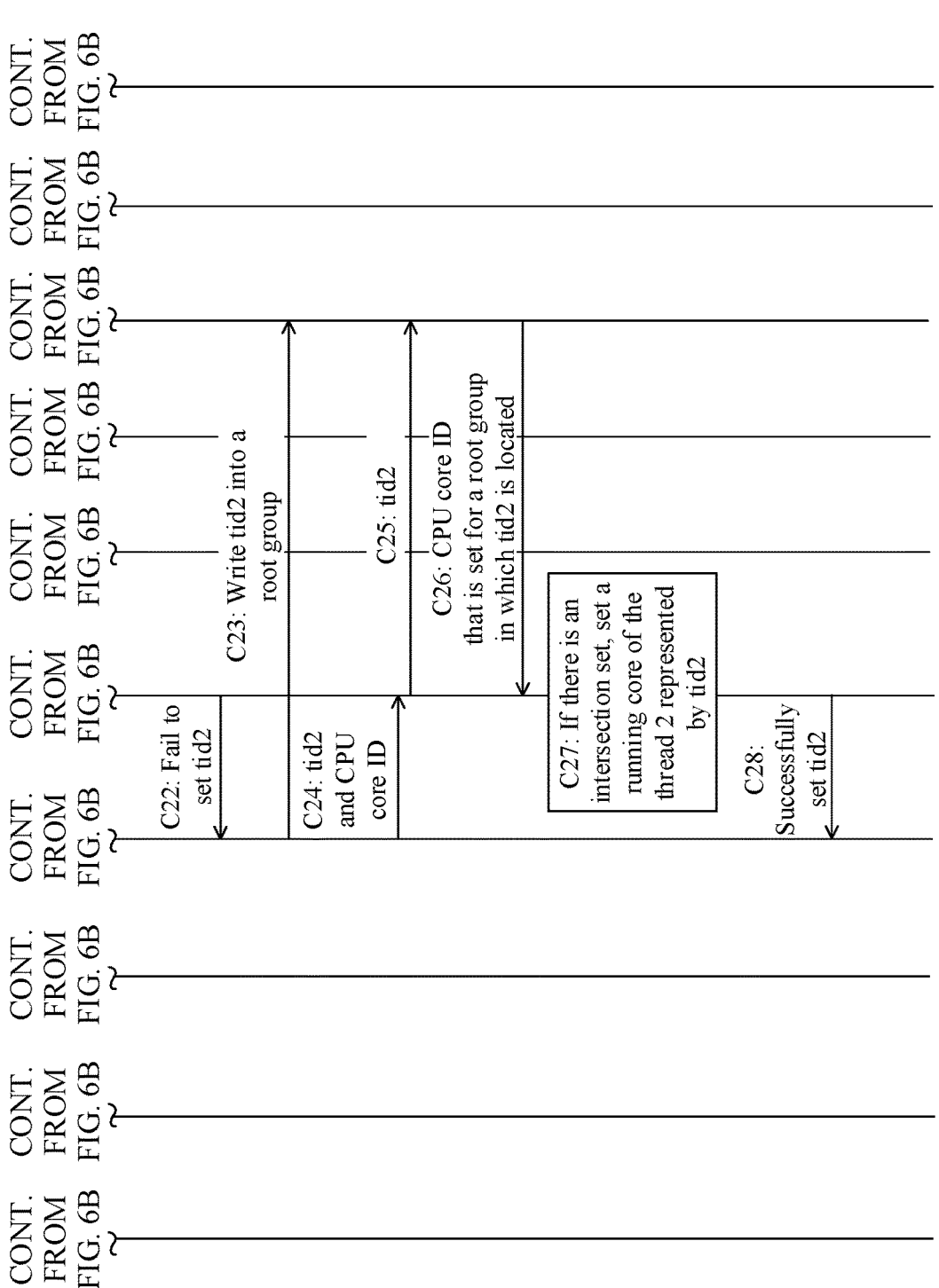

For the case in which the setting fails, refer to a sequence diagram of the task scheduling method provided in the embodiment shown in FIG. 6A to FIG. 6C.

Figure 5A:
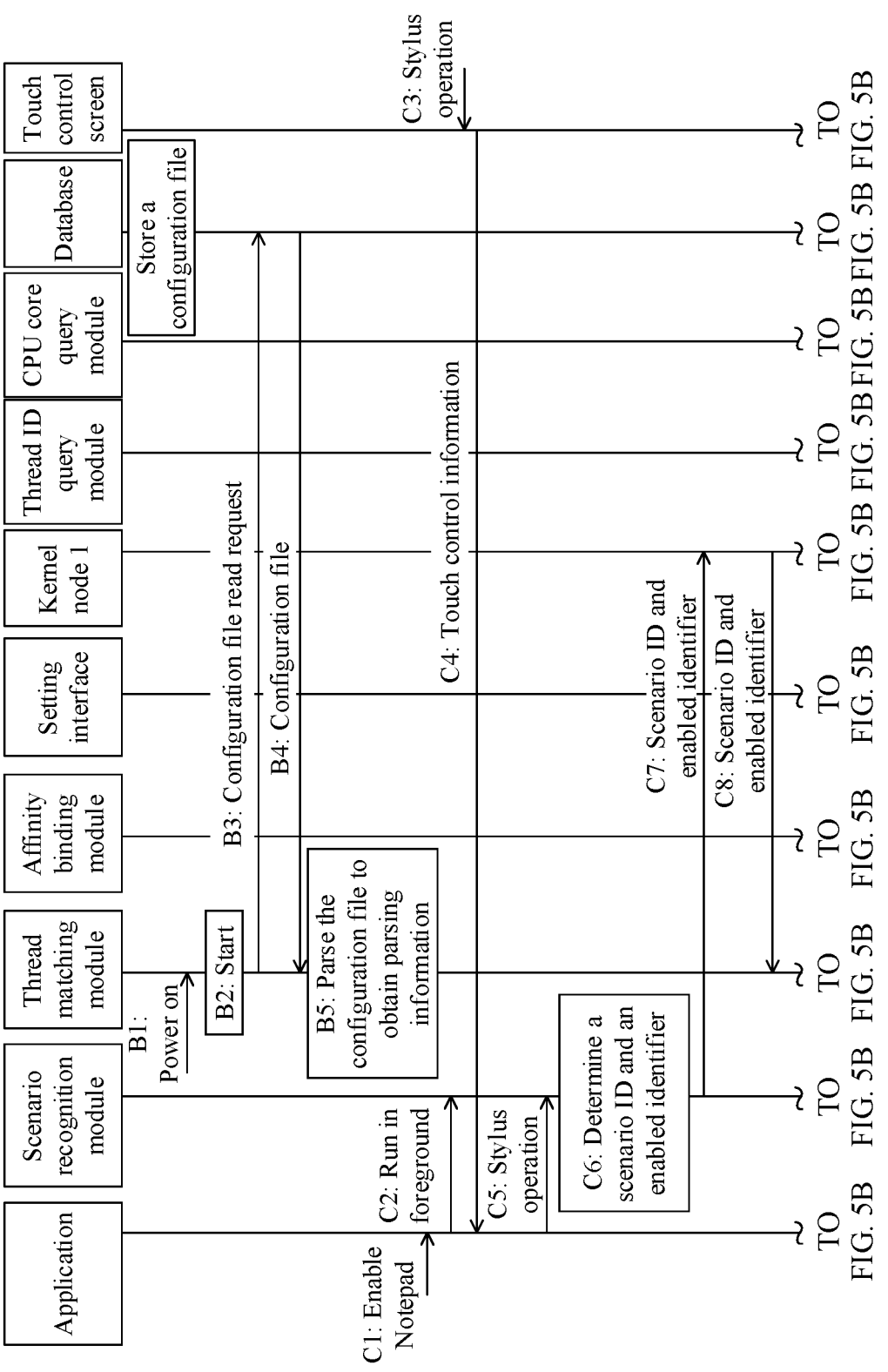
FIG. 5A to FIG. 5C are a sequence diagram of a task scheduling method when a scenario is enabled according to an embodiment of this application.
Figure 5B:
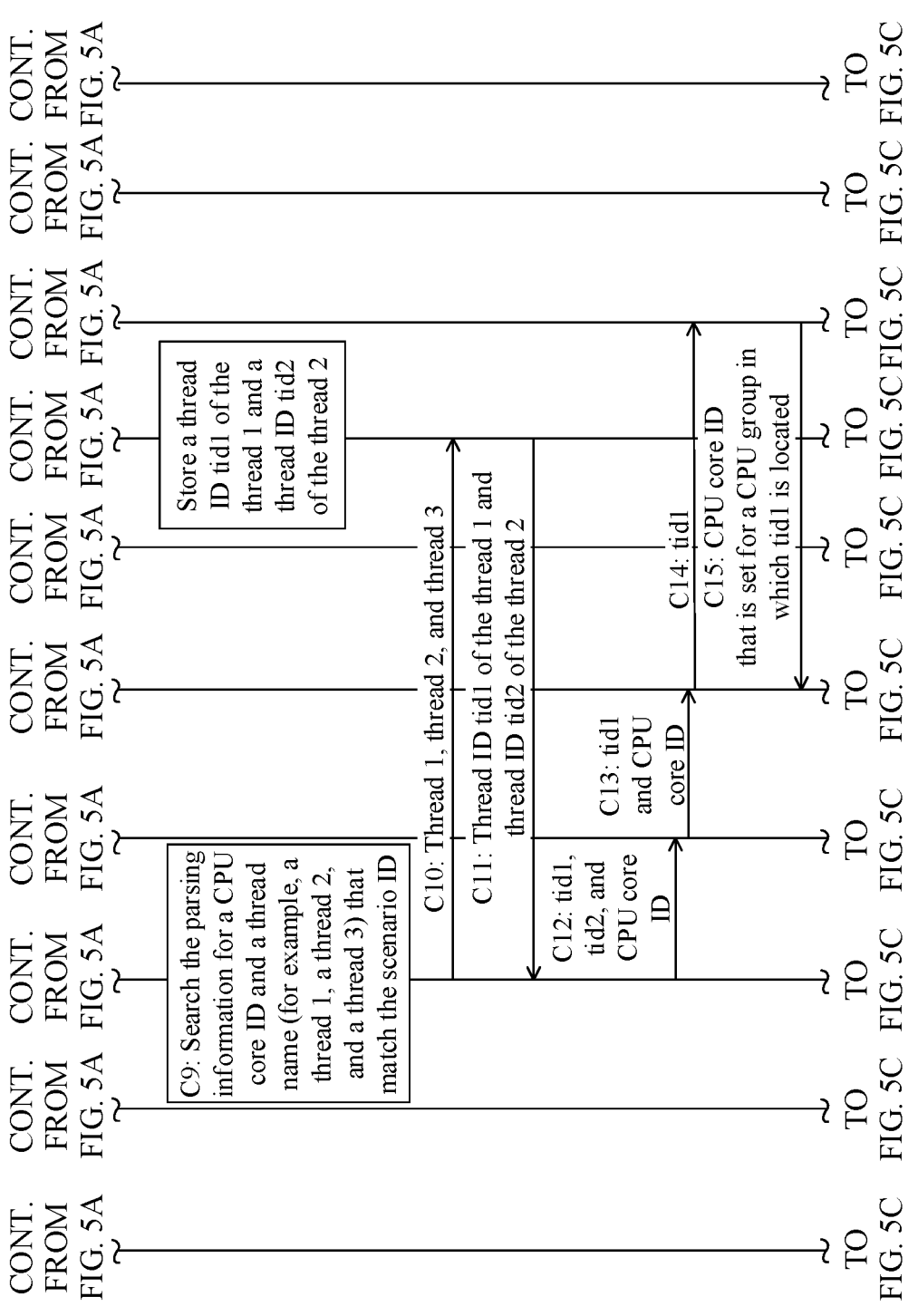
Figure 5C:
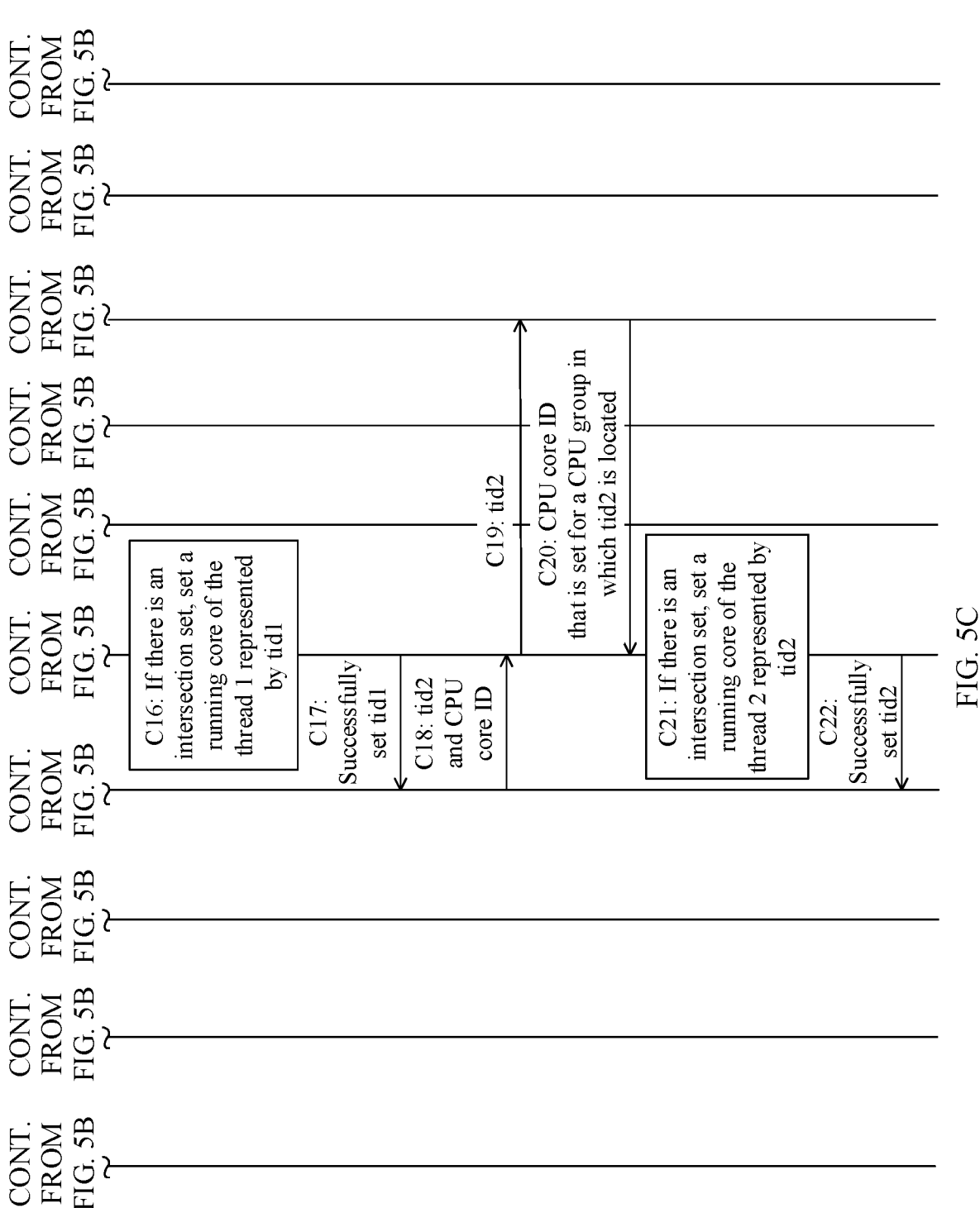

Step B1 to step C20 in FIG. 6A and FIG. 6B are the same as step B1 to step C20 in FIG. 5A to FIG. 5C. For details, refer to step B1 to step C20 in FIG. 5A to FIG. 5C. Details are not described herein again. Step C14 to step C17 are omitted in FIG. 6A to FIG. 6C.

Step C21: If there is no intersection set between the CPU core represented by the configuration core ID corresponding to tid2 and the group running core corresponding to tid2, the setting interface cannot successfully set a running core of the thread 2 represented by tid2 as a CPU core in the intersection set.

Step C22: The setting interface sends, to the core binding module, a message used to indicate that the setting of the configuration core of tid2 fails.

Step C23: The core binding module writes the thread ID of the thread 2 into a root group in the CGroup virtual file system stored in the CPU core query module, so that the thread 2 is set to the root group.

In this embodiment of this application, a thread ID exists in a CPU group (an original CPU group). If the thread ID is written into another CPU group (a new CPU group), the thread ID in the original CPU group disappears.

It should be noted that before step C23, the following steps further need to be performed:

The core binding module sends a read request of the CPU group of the thread 2 to the CGroup virtual file system stored in the CPU core query module.

The CGroup virtual file system stored in the CPU core query module stores information such as a CPU group in which a thread is located and a group running core of the CPU group in which the thread is located.

The core binding module reads the CPU group of the thread 2 from the CGroup virtual file system stored in the CPU core query module.

In this embodiment of this application, a CPU group in which the thread is currently located may be denoted as a first control group, and a group running core corresponding to the first control group is denoted as a first CPU core set. A CPU core in which the thread is currently located is denoted as a first CPU core.

The core binding module caches initial state information (for example, the CPU group in which the thread 2 is located) of the thread 2 in the core binding module in an array form.

The core binding module caches the initial state information of the thread 2, so that when the scenario is disabled, the group of the thread 2 is restored to an initial state. For details, refer to the descriptions of the embodiments shown in FIG. 10A to FIG. 10C and FIG. 11A to FIG. 11C.

Step C24: After the write operation in the CGroup virtual file system stored in the CPU core query module succeeds, the core binding module sends tid2 and the configuration core ID (the configured CPU core ID) to the setting interface.

After the write operation succeeds, the CPU group in which the thread is currently located is denoted as a second control group, and a group running core corresponding to the second control group is denoted as a second CPU core set. In this embodiment of this application, the second control group is a control group, where there is an intersection set (having a same CPU core) between a second CPU core set corresponding to the control group and a configured CPU core. In this embodiment of this application, the root group may be used as the second control group.

After receiving tid2 and the configuration core ID, the setting interface sets the thread 2 to run from the current running core to the configuration core.

Step C25: The setting interface sends the received thread ID (tid2) to the CGroup virtual file system stored in the CPU core query module, to request the CGroup virtual file system to return a CPU core ID that is set for a CPU group in which the thread ID is located. The CPU core ID represents the group running core in the foregoing embodiment.

Step C26: The CPU core query module returns an identifier corresponding to a group running core that is set for the CPU group in which tid2 is located.

Step C27: If there is an intersection set between the CPU core represented by the configuration core ID corresponding to tid2 and the group running core corresponding to tid2, the running core of the thread 2 represented by tid2 may be set as a CPU core in the intersection set.

Step C28: After the setting of the configuration core of tid2 succeeds, the setting interface returns, to the core binding module, a message used to indicate that the setting of the configuration core of tid2 succeeds. After the configuration core is successfully set for the thread 2 represented by tid2, the thread 2 runs on any CPU core in the configuration core.

In this embodiment of this application, after a configuration core is successfully set for a thread, a running core in which the thread is located is denoted as a second CPU core. When a CPU group of the thread (for example, the thread 2) has been switched, the second CPU core of the thread is a CPU core in an intersection set between the second CPU core set and the third CPU core set. When a CPU group of the thread (for example, the thread 1) is not switched, the second CPU core of the thread is a CPU core in an intersection set between the first CPU core set and the third CPU core set. To improve a processing speed of a thread, a computing capability of the second CPU core is higher than that of the first CPU core. For example, the first CPU core is a small core, and the second CPU core is a large core.

In the embodiment shown in FIG. 6A to FIG. 6C, when the setting interface returns a setting failure message, the core binding module caches a CPU group of a thread whose setting fails, and switches the thread, whose setting fails, to a root group, to re-set the thread to run on a configuration core.

Figure 7:
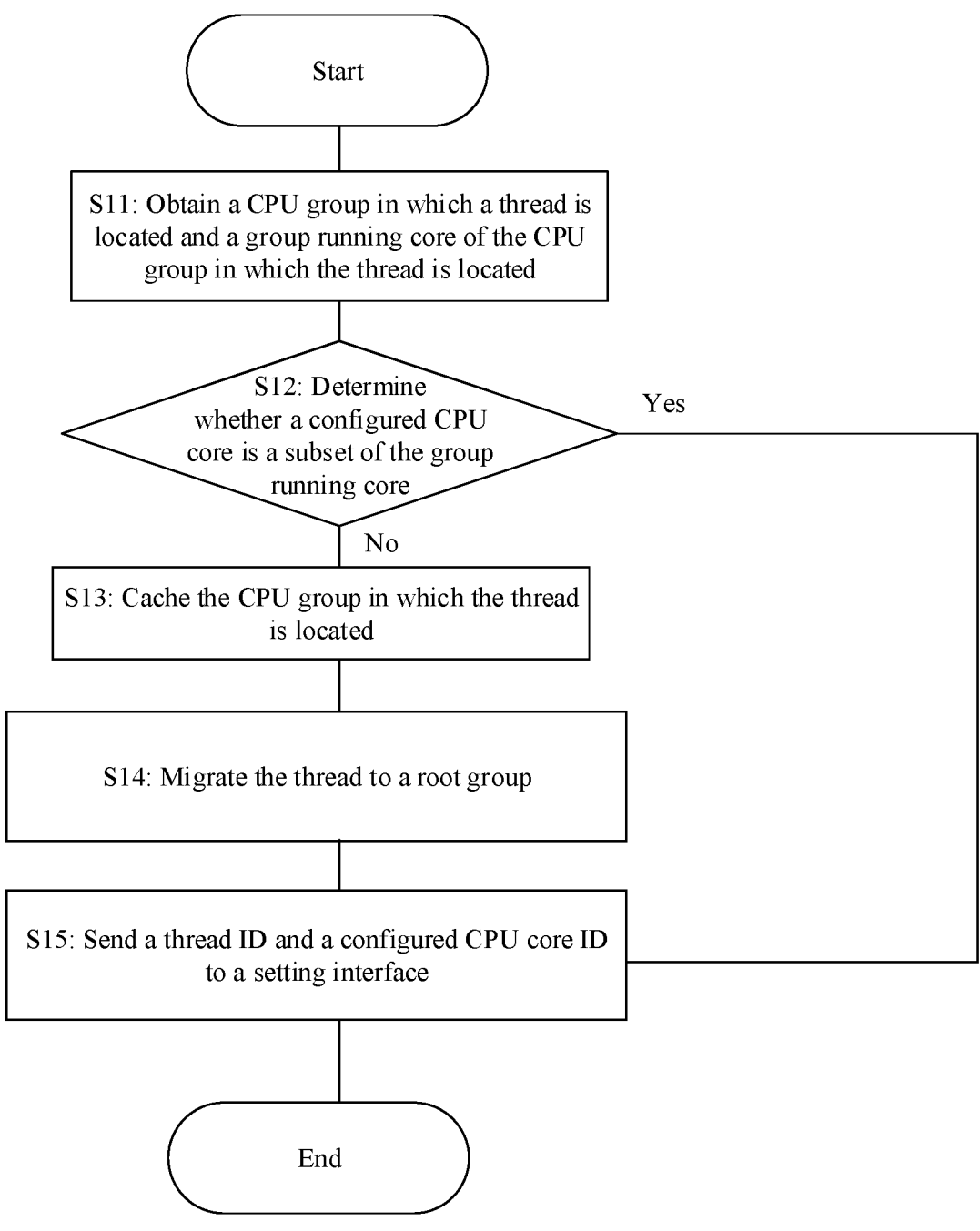
FIG. 7 is a flowchart of performing a core binding operation by a core binding module in a task scheduling method according to an embodiment of this application.

In another embodiment, referring to the flowchart shown in FIG. 7, the core binding module may first determine whether a CPU group of a thread whose setting may fail (a group running core does not include a configuration core) needs to be cached, switch the thread, whose setting may fail, to the root group, and then send the thread name and a configuration core ID to the setting interface.

Any thread is used as an example. After receiving a thread ID and a configuration core ID that are sent by the thread matching module, the core binding module may perform the following steps:

S11: The core binding module obtains, from the CGroup virtual file system stored in the CPU core query module, a CPU group in which the thread is located and a group running core of the CPU group in which the thread is located.

S12: The core binding module determines whether a configuration core of the thread is a subset of the group running core.

S13: If no configuration core of the thread is a subset of the group running core, the core binding module caches the CPU group in which the thread is located.

S14: The core binding module writes the thread ID into the root group in the CGroup virtual file system stored in the CPU core query module, to migrate the thread to the root group.

S15: The core binding module sends the thread ID and the configuration core ID (the configured CPU core ID) to the setting interface.

Certainly, after step S12, if any configuration core of the thread is a subset of the group running core of the CPU group in which the thread is located, step S15 that the core binding module sends the thread ID and the configuration core ID to the setting interface is performed.

As described above, the proc file system stores a currently running process (a process name and a process ID) and a running thread (a thread name and a thread ID) in the process. A process in which the thread matching module searches a large amount of information stored in the proc file system for the thread 1 in the process A, the thread 2 in the process B, and the thread 3 in the process C consumes a large amount of time.

If a process in which a configured thread is located is a system process (namely, a process required for normal running of the electronic device), the thread does not start because a scenario that supports task scheduling is enabled, and does not terminate because the scenario that supports task scheduling is disabled (for example, the surfaceflinger thread is used to composite an image, and the surfaceflinger thread does not terminate provided that the electronic device is in an on state (a screen needs to be refreshed)). Therefore, a step of searching the proc file system for the surfaceflinger thread obtained from the configuration information through matching is not used to determine whether the surfaceflinger thread is in a running state, but is used to obtain an ID of the surfaceflinger thread obtained from the configuration information through matching. However, the thread ID of the surfaceflinger thread is different each time after the surfaceflinger thread starts. Therefore, the thread ID of the surfaceflinger thread cannot be directly configured in the configuration file.

Based on the foregoing descriptions, it may be understood that, if a process in which a thread is located is a system process of the electronic device, an ID of the thread is not changed after the electronic device is powered on. Therefore, the thread ID that is of the thread and that is obtained by querying the proc file system may be stored into another file. When the electronic device is not powered off or not restarted, the ID of the thread is not changed. If a scenario ID that currently supports task scheduling is not recognized for the first time after the electronic device is powered on, the thread ID of the thread is obtained from the another file, thereby reducing search time and improving processing efficiency.

Figure 8A:
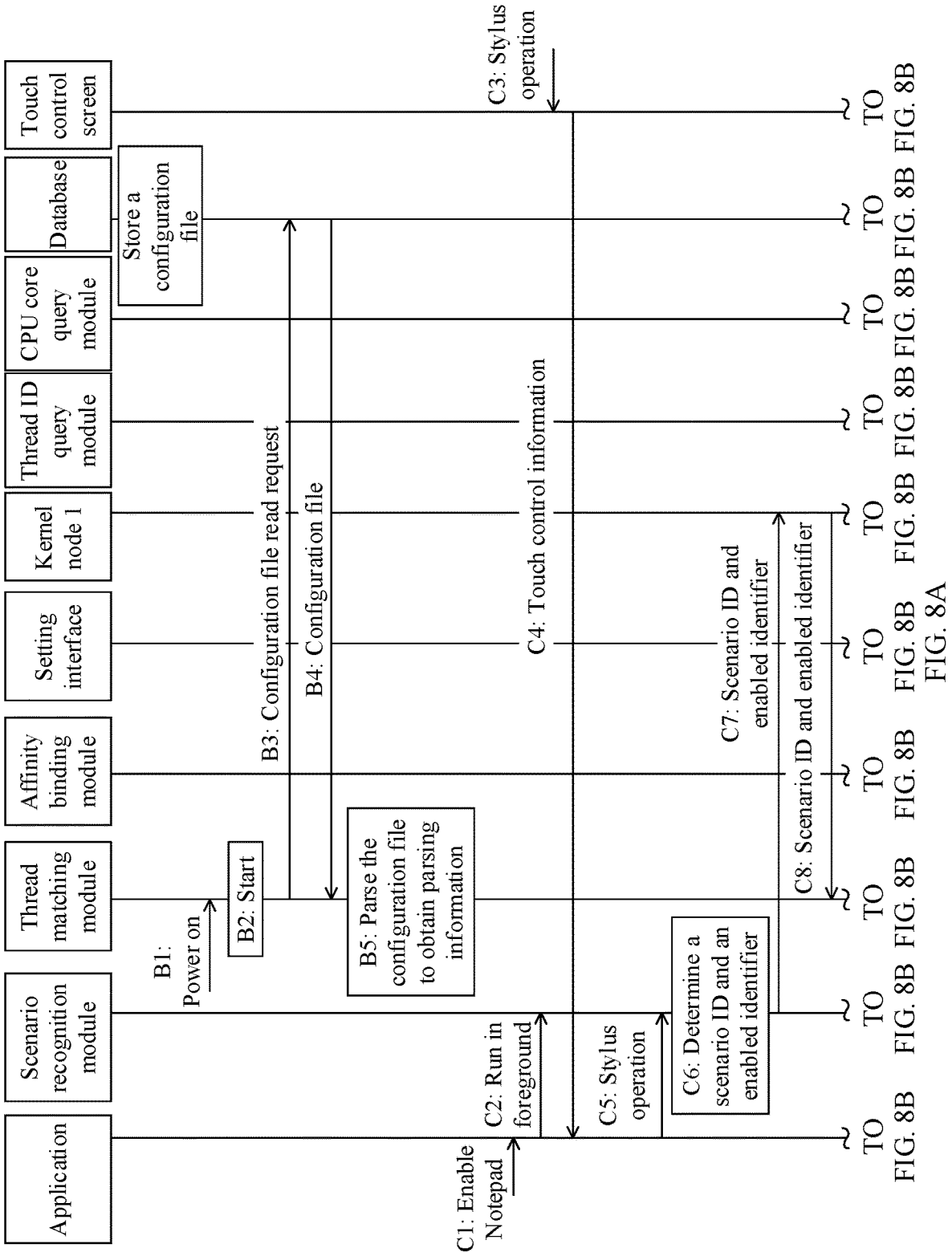
FIG. 8A to FIG. 8C are another sequence diagram of a task scheduling method when a scenario is enabled according to an embodiment of this application.
Figure 8B:
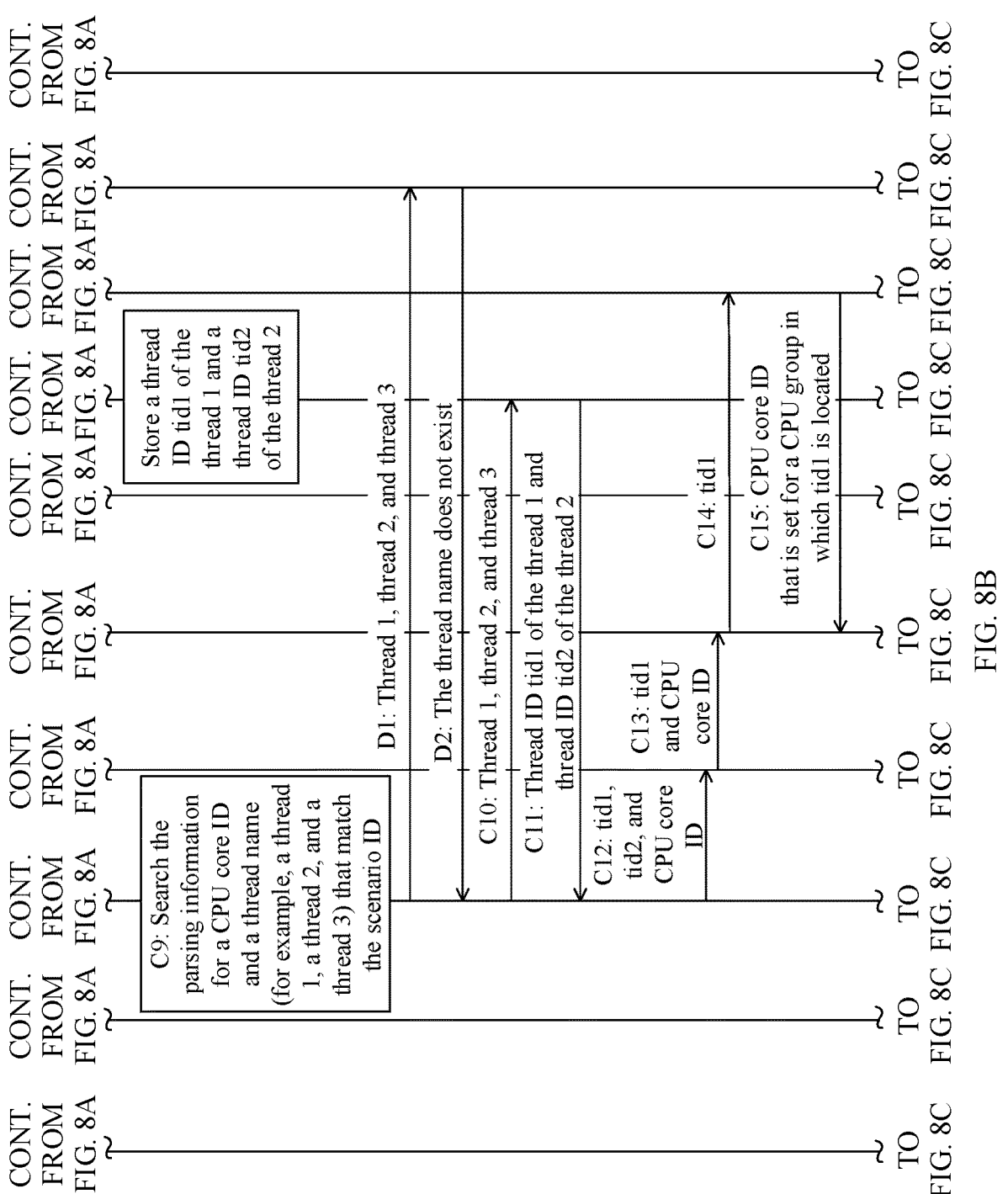
Figure 8C:
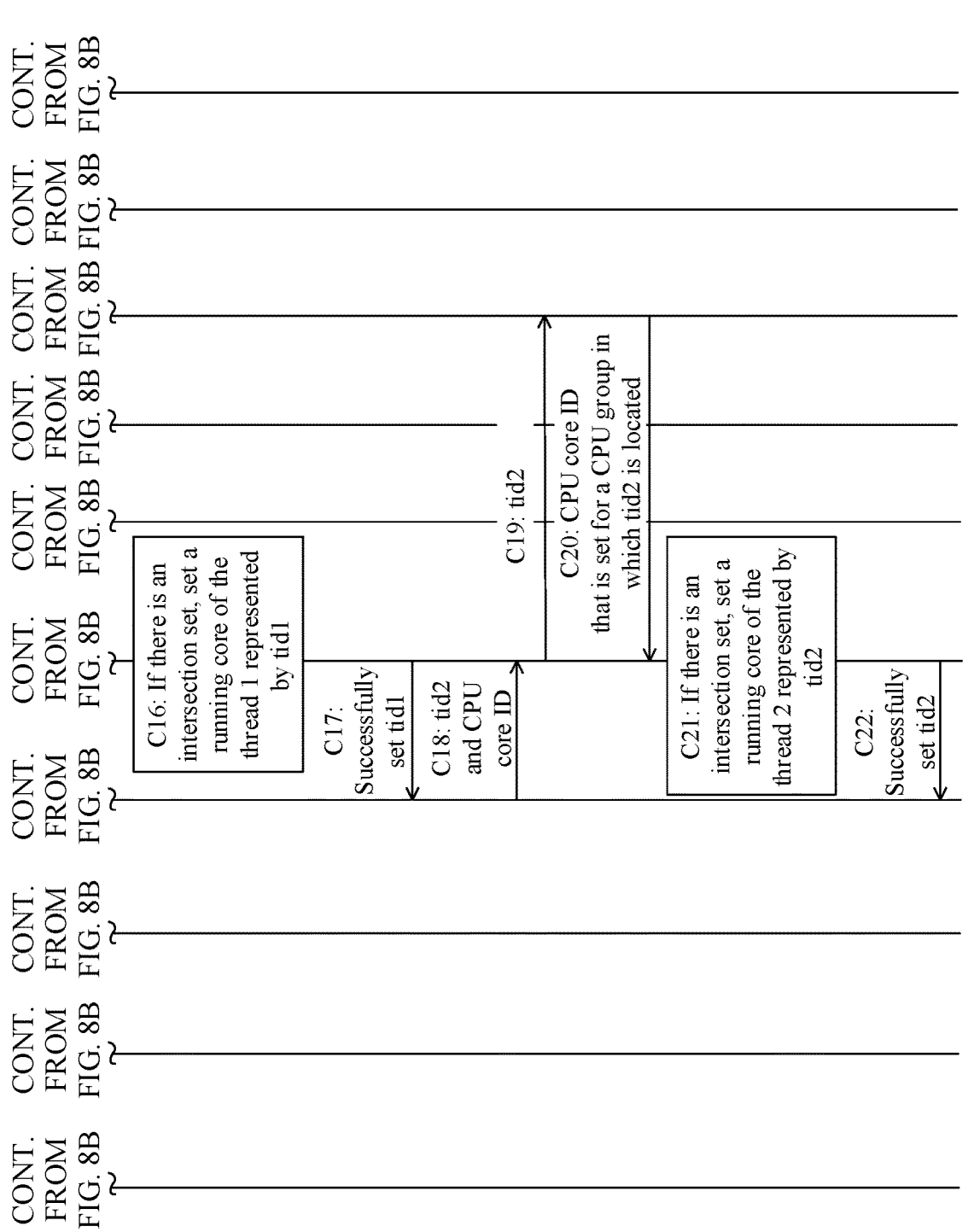

Referring to the sequence diagram provided in the embodiment shown in FIG. 8A to FIG. 8C, the following problem may be resolved: The process in which the thread matching module searches the proc file system in the thread ID query module for the thread 1 in the process A, the thread 2 in the process B, and the thread 3 in the process C consumes a large amount of time.

Compared with the embodiments shown in FIG. 5A to FIG. 5C, FIG. 6A to FIG. 6C, and FIG. 7, after the thread 1 (tid1) and the thread 2 (tid2) are obtained by searching the proc file system in step C11, step D3 is added, to store, into a cache file (which may be denoted as a second file), tid1 of the thread 1 and tid2 of the thread 2 that are obtained by searching the proc file system. The cache file is cached in a static internal memory.

In a specific implementation, when the scenario ID that supports task scheduling is recognized for the first time after the electronic device is powered on, the electronic device determines, by searching the proc file system in the thread ID query module, whether a thread name in a process name obtained by searching the parsing information exists, returns a thread ID when the thread is found, and stores the thread name and the thread ID into the cache file. When the same scenario ID that supports task scheduling is recognized again after the scenario ID is recognized for the first time, it is determined, by searching the cached cache file, whether a thread name obtained by searching the parsing information exists, and a thread ID corresponding to the thread name is returned when the thread name can be found.

Certainly, in actual application, the following may be set: After the electronic device is powered on, regardless of which time a scenario ID that supports task scheduling is recognized, after the related process name and thread name are obtained from the parsing information through matching (step C9), step D1 is performed to first determine, by searching the cached cache file, whether a thread name and a corresponding thread ID that are obtained by searching the parsing information exist.

Referring to step D2 in the sequence diagram shown in FIG. 8B, if it is determined, by searching the cached cache file, that a thread name (the thread 1 in the process A, the thread 2 in the process B, and the thread 3 in the process C) in the process name obtained from the parsing information through matching does not exist, step C10 and step C11 need to be performed to determine, by searching the proc file system in the thread ID query module, whether the thread name (the thread 1 in the process A, the thread 2 in the process B, and the thread 3 in the process C) in the process name obtained from the parsing information through matching exists.

After step C10 and step C11 are performed to obtain, by searching the proc file system, the thread name in the process name obtained from the parsing information through matching, step D3 is performed to store, into the cache file, the thread name and the thread ID that are newly found from the proc file system.

In addition, in the embodiment shown in FIG. 8A to FIG. 8C, a process in which a configured thread is located may not be a system process, that is, a thread ID of the thread may be changed. If the method is applied to a scenario in which the thread ID of the configured thread may be changed, a thread name and a thread ID may also be obtained from the cache file. However, the thread name and the thread ID that are obtained from the cache file need to be checked.

In actual application, the cache file further stores a process name in which the thread is located and a process ID. Therefore, the process name, the process ID, the thread name in the process name, and the thread ID can be obtained from the cache file. Based on the process name, the process ID, the thread name in the process name, and the thread ID that are obtained from the cache file, whether the thread ID corresponding to the thread name is correct is checked in the proc file system.

In an example, the information obtained by querying the cache file includes a process whose process name is a process 1 and process ID is pid1, and a thread that is in the process and whose thread name is a thread 1 and thread ID is tid1. Whether a process name node (for example, comm node) of pid1 is the process 1 can be determined by querying the proc file system. If yes, a thread directory (for example, a task directory) corresponding to pid1 is searched for a tid1 directory, and after the tid1 directory is found, whether a thread name node (for example, a comm node) of tid1 is the thread 1 is determined by searching the tid1 directory. If yes, check on the thread 1 (tid1) succeeds. If any step in the foregoing steps fails, check on the thread 1 (tid1) fails.

If check on each thread obtained by searching the cache file succeeds, it indicates that check on all the threads succeeds, and a core binding operation can be performed. If check on any thread obtained by searching the cache file fails, cache information corresponding to a thread name currently obtained from the configuration file through matching is deleted from the cache file. Then, the proc file system is searched again for the process name obtained from the parsing information of the configuration file through matching and IDs respectively corresponding to thread names in the process. In addition, the information obtained by searching the proc file system again is stored into the cache file.

Figure 9A:
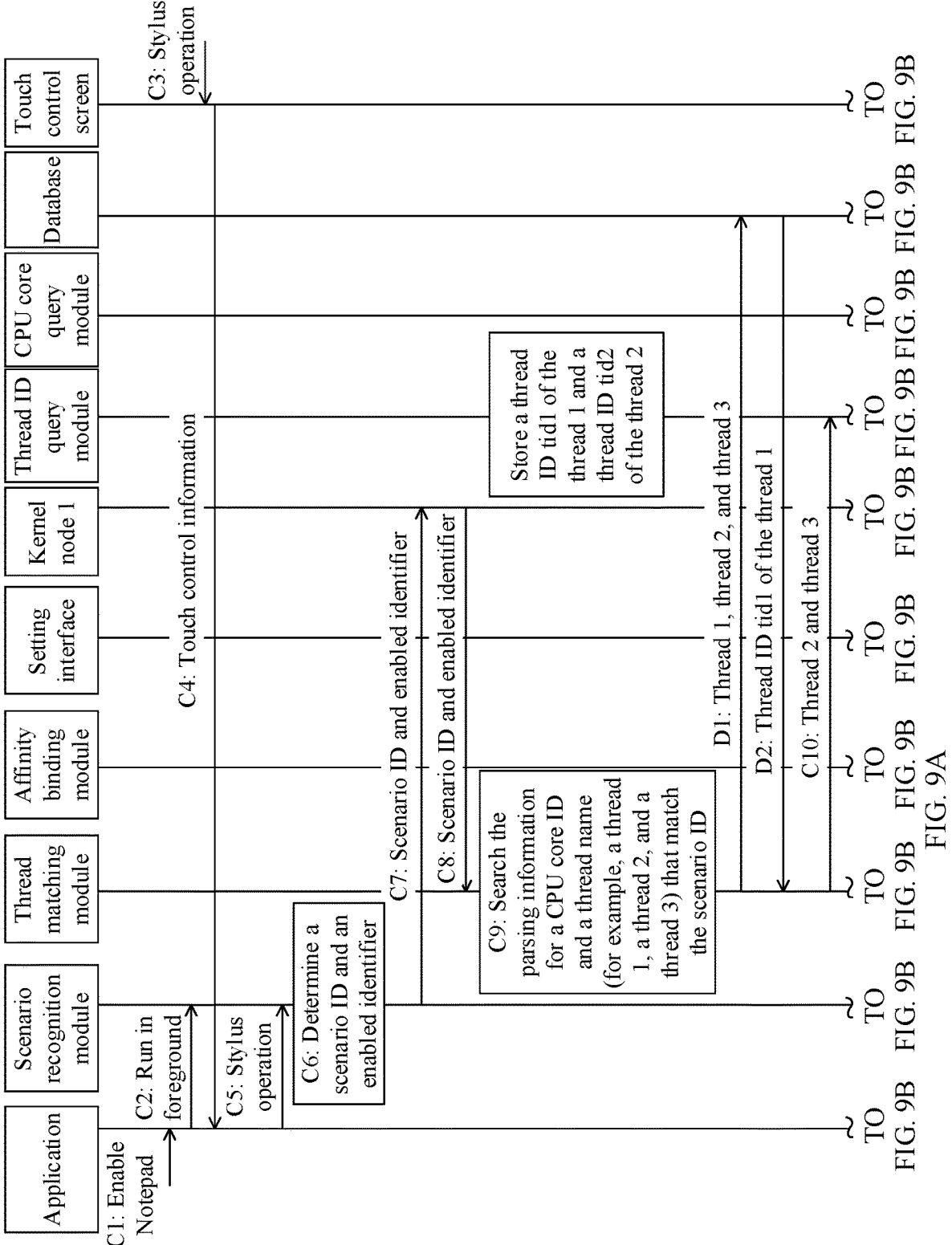
FIG. 9A to FIG. 9C are another sequence diagram of a task scheduling method when a scenario is enabled according to an embodiment of this application.
Figure 9B:
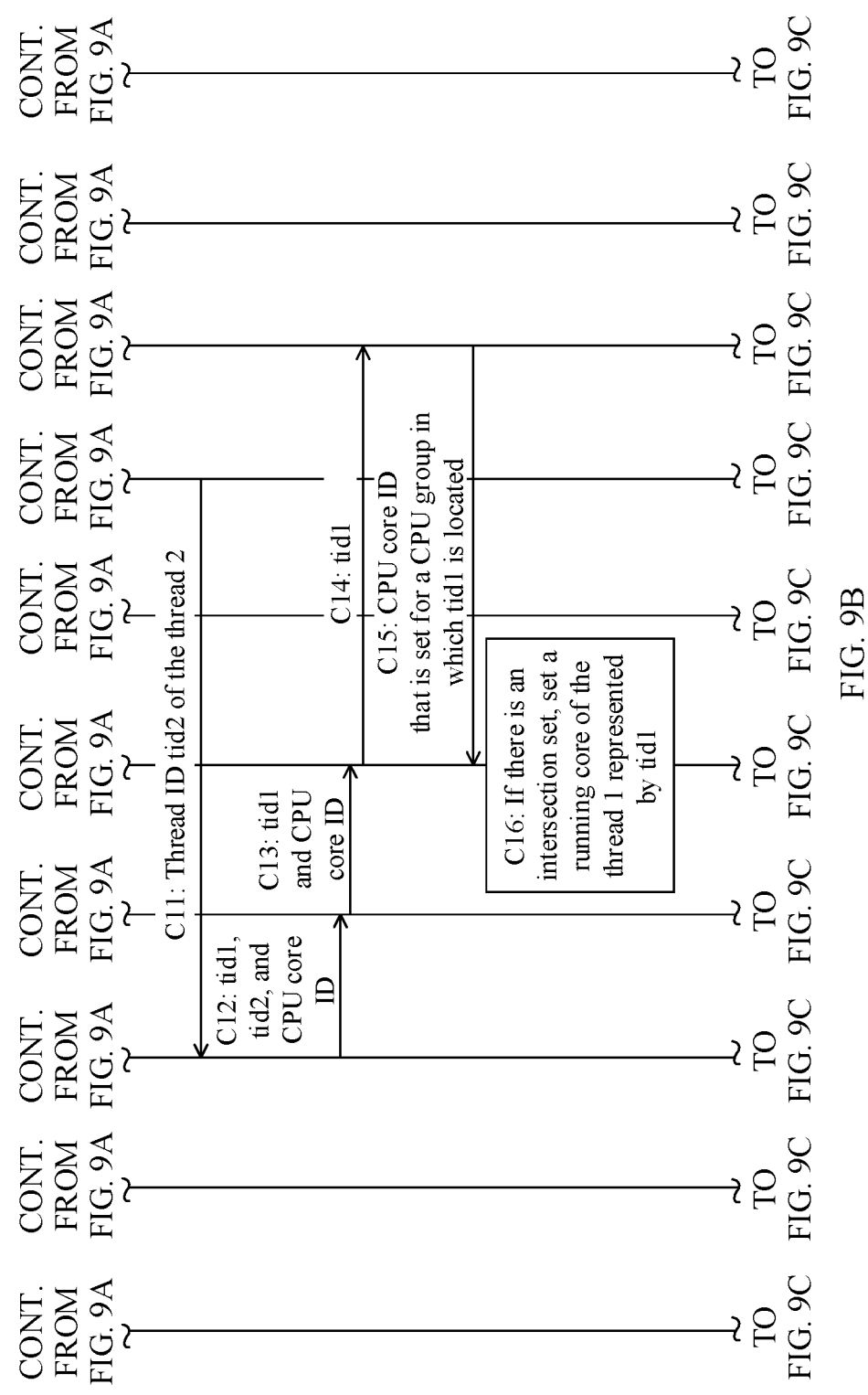
Figure 9C:
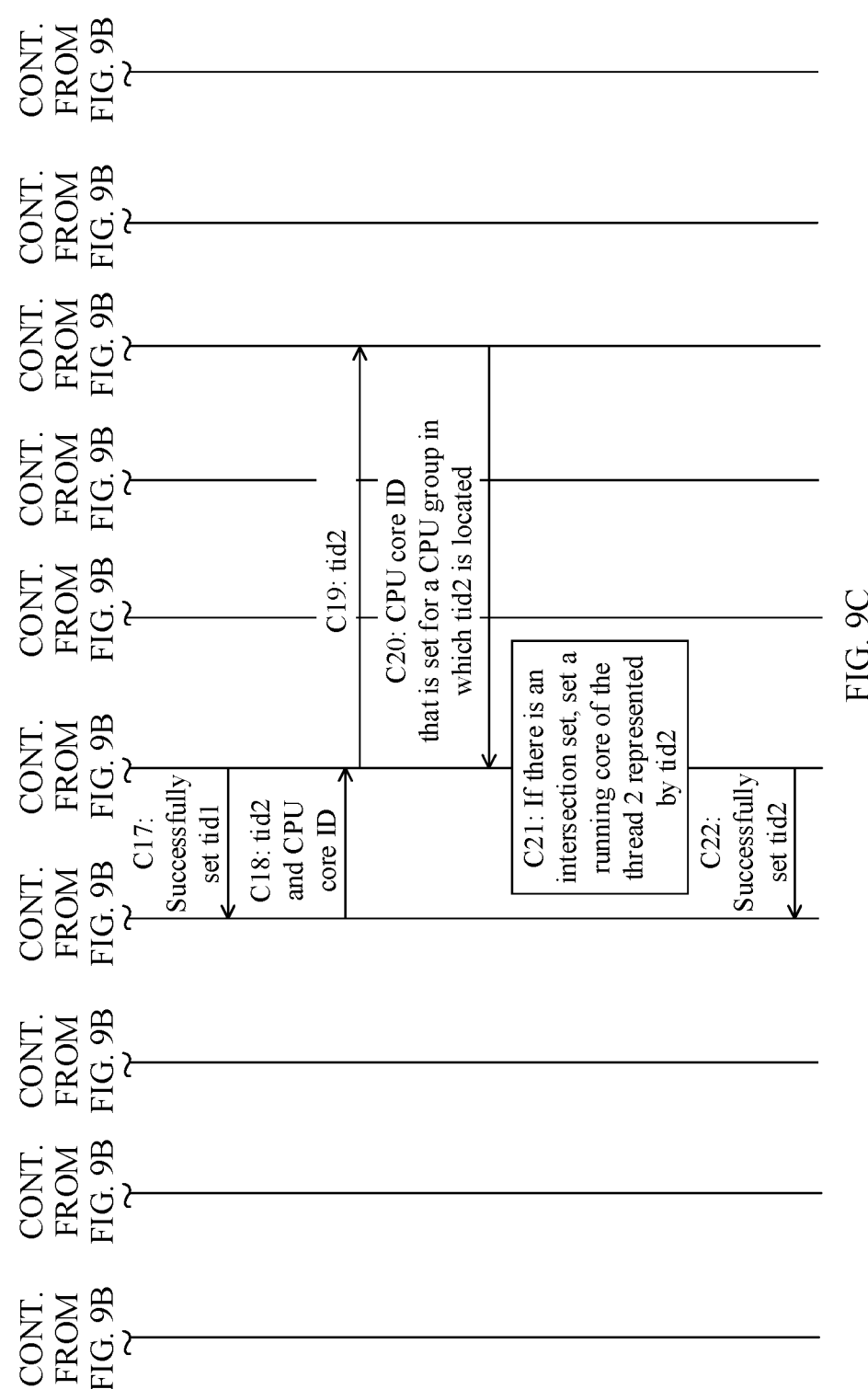

In another embodiment, referring to step D1 and step D2 in the sequence diagram shown in FIG. 9A, after the method is run to step D1 at a specific time, if it is determined, by searching the cached cache file, that some thread names (for example, the thread 1 in the process A and the thread 2 in the process B) obtained from the parsing information through matching exist, the thread matching module obtains a thread ID (tid1) of the thread 1 and a thread ID (tid2) of the thread 2 in step D2. However, if a thread ID of the thread 3 is not found, step C9 and step C10 need to be performed to search the proc file system in the thread ID query module for a thread name (thread 3) and a thread ID that are not found from the cache file.

A reason is that a thread may be used in a plurality of scenarios, and different threads may be configured in the plurality of scenarios.

In an example, the surfaceflinger thread in the surfaceflinger process may be used in a scenario related to image composition, and is not used only in the stylus scenario of the Notepad. For example, the surfaceflinger thread in the surfaceflinger process may also be used in the multi-screen interaction scenario. However, another thread that is not configured in the multi-screen interaction scenario may be configured in the stylus scenario of the Notepad: the thread 2. If the multi-screen interaction scenario has been executed after the electronic device is powered on, the thread ID (tid1) of the surfaceflinger thread is stored in the cache file. If the electronic device recognizes the stylus scenario of the Notepad after recognizing the multi-screen interaction scenario, the surfaceflinger thread and tid1 are stored in the cache file. However, the thread 2, tid2, the thread 3, and tid3 are not stored. Therefore, the thread 2 and the thread 3 further need to be obtained by searching the proc file system, and when a thread is found, a thread ID of the found thread is returned. For details, refer to step D1 to step C11 in FIG. 9A and FIG. 9B. For step C1 to step C9 in FIG. 9A, refer to the foregoing descriptions in the embodiment shown in FIG. 5A to FIG. 5C. For step C11 to step C22 in FIG. 9B and FIG. 9C, refer to the foregoing descriptions in the embodiment shown in FIG. 5A to FIG. 5C. Details are not described herein again. For other steps, refer to the following descriptions:

Step D1: The thread matching module determines, by searching the cache file, whether the thread 1, the thread 2, and the thread 3 exist.

Step D2: The thread matching module obtains the thread ID (tid1) of the thread 1 by searching the cache file.

Step C10: When determining that there is still a thread ID (the thread ID of the thread 2 and the thread ID of the thread 3) that is not found, the thread matching module continues to search the proc file system in the thread ID query module for the thread 2 and the thread 3.

Step C11: The thread matching module obtains the thread ID (tid2) of the thread 2 by searching the proc file system.

Step D3: The thread matching module stores, into the cache file, the thread 2 and the thread ID of the thread 2 that are obtained by searching the proc file system.

Certainly, in step C11, if the thread matching module does not obtain the thread 2 and the thread ID of the thread 2 by searching the proc file system, and does not obtain the thread 3 and the thread ID of the thread 3, step D3 does not need to be performed.

In another example, in step D2, if the thread matching module obtains, by searching the cache file, a thread ID of each thread obtained from the parsing information through matching, the thread matching module does not need to perform step C10 and step C11, and naturally does not need to perform step D3.

An example in which the scenario that supports task scheduling is enabled is recognized is used above. The following describes, by using an example in which the scenario that supports task scheduling is disabled, a sequence diagram of any task scheduling method provided in this embodiment of this application. A sequence diagram existing when a scenario is disabled and a sequence diagram existing when a scenario is enabled correspond to each other.

Figure 10A:
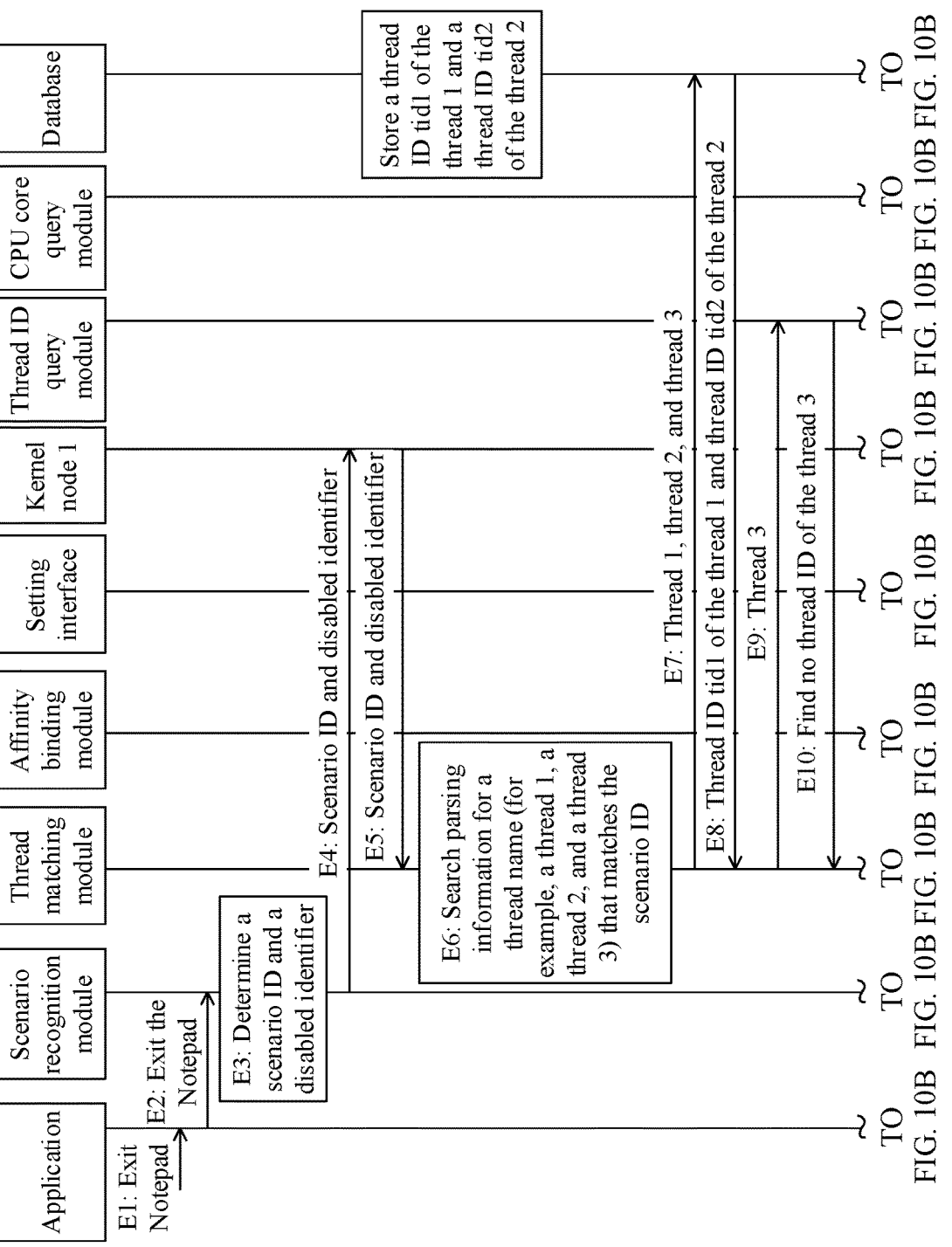
FIG. 10A to FIG. 10C are a sequence diagram of a task scheduling method when a scenario is disabled according to an embodiment of this application.
Figure 10B:
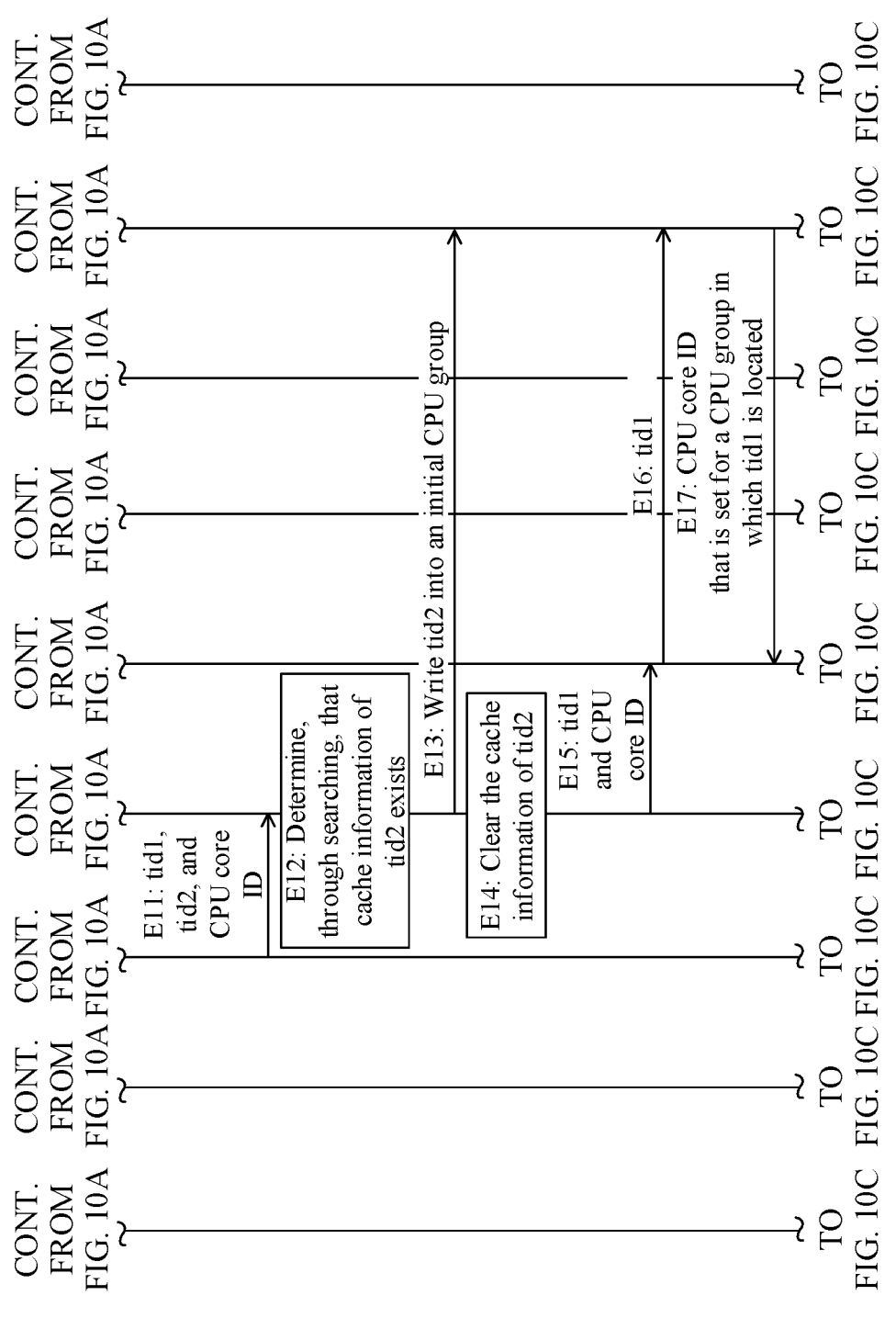
Figure 10C:
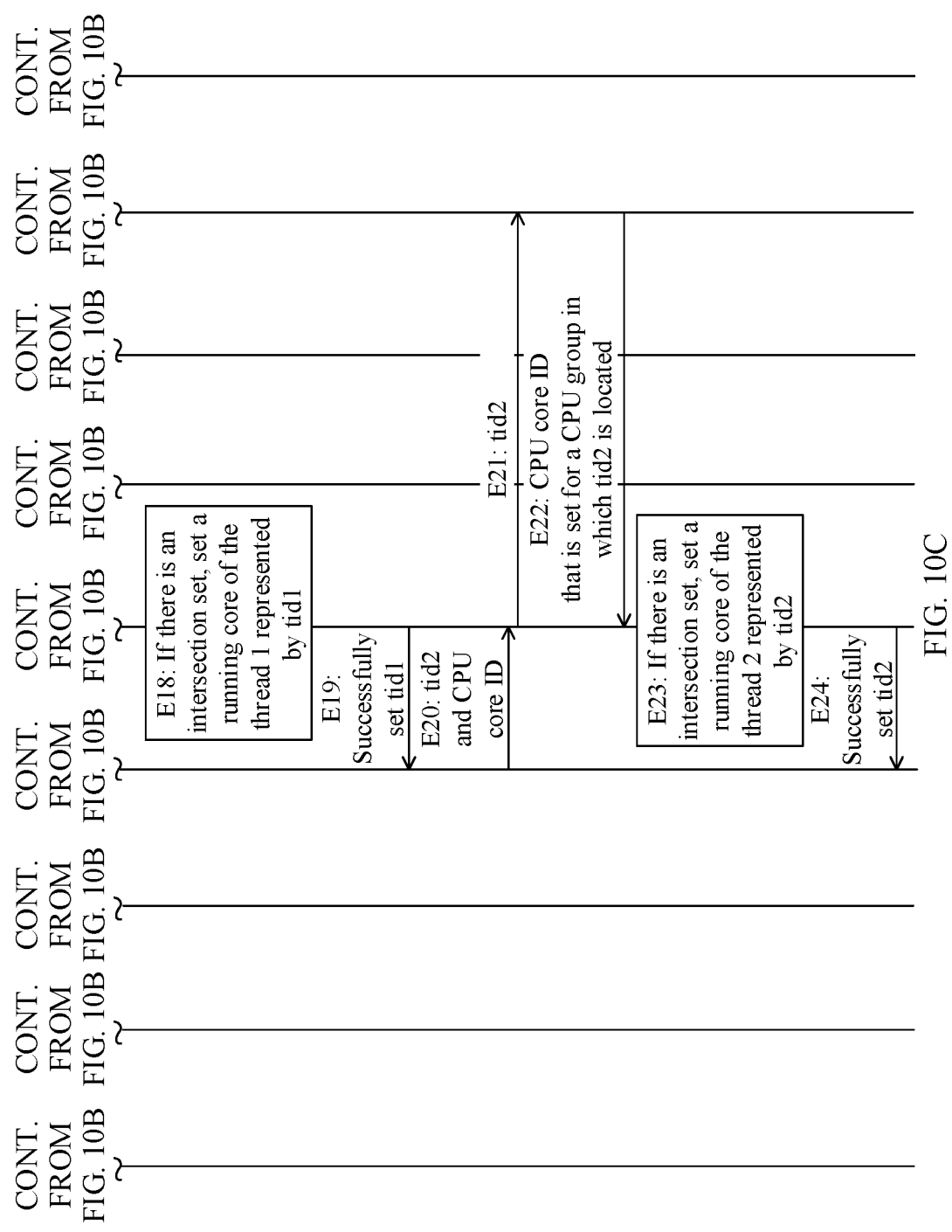

FIG. 10A to FIG. 10C are a sequence diagram of a method for restoring to an initial state when the scenario corresponding to the foregoing embodiment is disabled.

Step E1: After the user ends using the Notepad, the user exits the Notepad application, for example, may switch the Notepad back to background, or may disable the Notepad.

Step E2: The scenario recognition module detects that the Notepad application is disabled.

Step E3: After detecting that the Notepad application is disabled, the scenario recognition module determines a scenario ID (for example, 0) and a disabled identifier. The scenario ID and the disabled identifier indicate that the Notepad scenario is disabled.

In actual application, when the Notepad application is switched back to background, the scenario recognition module may also determine the scenario ID (for example, 0) and the disabled identifier. When a current scenario is a stylus scenario (the stylus scenario ID and the enabled identifier are currently stored in the kernel node 1), and the user touches the handwriting interface of the Notepad by using the finger, the scenario ID (for example, 0) and the disabled identifier may also be determined. When the operation of the user triggers the Notepad application to be currently switched from the stylus scenario to any other scenario (or disabled), the scenario recognition module may determine the scenario ID (for example, 0) and the disabled identifier.

Similarly, the following logical content may also be set in the kernel node 1 or the scenario recognition module:

When the scenario ID and the disabled identifier are written into the kernel node 1, if the kernel node 1 receives again a same scenario ID and a disabled identifier that are sent by the scenario recognition module, the kernel node 1 no longer sends the newly received scenario ID and disabled identifier to the thread matching module.

When the scenario ID and the enabled identifier have been written into the kernel node 1, if the kernel node 1 receives a same scenario ID and a disabled identifier that are sent by the scenario recognition module, the kernel node 1 sends the received scenario ID and disabled identifier to the thread matching module.

In this embodiment of this application, an operation of exiting the first application, an operation of switching the first application to background, or an operation of touching the interface of the first application by the user, where the operation is detected by the electronic device, may be denoted as a second operation.

Step E4: The scenario recognition module writes the disabled identifier and the scenario ID into the kernel node 1.

Step E5: After detecting the write operation, the kernel node 1 sends the written data (the disabled identifier and the scenario ID) to the thread matching module based on the foregoing logic.

Step E6: After receiving the disabled identifier and the scenario ID that are sent by the kernel node 1, the thread matching module obtains, from the parsing information based on the scenario ID, a thread in a process corresponding to the scenario ID: the thread 1 in the process A, the thread 2 in the process B, and the thread 3 in the process C.

When an enabled/disabled identifier of a scenario that supports task scheduling is a disabled identifier, and information that matches the scenario ID is obtained from the parsing information, a configuration core may not be obtained any longer.

Step E7: The thread matching module determines, by searching the cache file stored in the memory, whether the thread 1, the thread 2, and the thread 3 exist.

Step E8: If a result obtained by the thread matching module through searching includes the thread 1 and the thread 2, the thread ID (tid1) of the thread 1 and the thread ID (tid2) of the thread 2 are obtained.

If the foregoing method for setting a cache file is used, it indicates that a thread configured for a scenario that supports task scheduling is a thread that always runs after the electronic device is powered on, and does not run because a scenario is enabled, and does not terminate because a scenario is disabled. Certainly, after the electronic device is powered on or restarted, the electronic device clears a thread name and a thread ID that are stored in the cache file.

If the foregoing case does not exist, and the foregoing method for setting a cache file is still used, the following case may occur:

After the electronic device is powered on, when it is recognized for the first time that a scenario 1 is enabled, the thread 1 starts and runs. In this case, the thread ID of the thread 1 is tid11, the thread 1 is obtained from the parsing information of the scenario 1 through matching. If the thread 1 is not found from the cache file, the thread ID of the thread 1 is found from the proc file system, and the thread 1 and the thread ID are stored into the cache file. After the scenario 1 ends, the thread 1 terminates.

When it is recognized again that the scenario 1 is enabled, the thread 1 starts and runs. In this case, the thread ID of the thread 1 is tid12 (a new thread ID is allocated after a same thread terminates and starts again). The thread 1 is obtained from the parsing information of the scenario 1 through matching, and the thread 1 is found from the cache file. However, the thread ID of the found thread 1 is tid11, and the thread ID of the thread 1 has been changed to tid12 at this time. Therefore, the method for setting a cache file is no longer applicable. Certainly, when the thread ID of the thread 1 is found from the proc file system, the found thread ID is tid12.

Therefore, when a thread configured for a scenario is not a thread that always runs after the electronic device is powered on, the foregoing method for setting a cache file cannot be used. Instead, a thread ID needs to be found from the proc file system. Alternatively, a method for performing check in the proc file system provided in the foregoing embodiment is used.

In this embodiment of this application, a method for setting a cache file to store a thread ID and that a CPU group of the thread 2 has been switched are used as an example for description.

Step E9: Because the thread ID of the thread 3 is not obtained by querying the cache file, the thread matching module further needs to obtain the thread ID of the thread by querying the proc file system.

Step E10: The thread matching module does not obtain the thread ID of the thread 3 by querying the proc file system.

It should be noted herein that if a thread is not obtained by querying the proc file system when a scenario is enabled or disabled, a reason may be a configuration error, or a scenario no longer depends on a thread as the system improves after the configuration file is stored.

Step E11: The thread matching module sends, to the core binding module, the thread ID (tid1 and tid2) and a full-core ID representing all CPU cores of the electronic device.

The full-core ID may be identified by using "11111111", and specifically indicates that a core 0 to a core 7 in an 8-core CPU may be set.

That is, the thread matching module sends the configuration core ID to the core binding module when the scenario is enabled, and sends the full-core ID to the core binding module when the scenario is disabled.

Step E12: After receiving the thread ID (tid1 and tid2) sent by the thread matching module, the core binding module determines, through searching, whether cache information of tid1 and tid2 exists, where a query result is that the cache information of tid2 exists. The cache information is stored in a first storage space.

If the search result is that the cache information of tid2 exists, it indicates that the CPU group is previously reset for the thread 2. Therefore, the thread 2 needs to be switched back to the original CPU group stored in the cache information.

Step E13: The core binding module writes tid2 into an initial CPU group (stored in the cache information) in the CGroup virtual file system stored in the CPU core query module, so that the CPU group of the thread 2 is switched to the initial CPU group (the first control group) existing before the thread is switched to the root group.

Step E14: After the write operation succeeds, the stored cache information of tid needs to be cleared.

Step E15: After the write operation to the CGroup virtual file system stored in the CPU core query module succeeds, the core binding module successively performs an core binding operation on the thread ID and the full-core ID that are received from the thread matching module. For example, tid1 and the full-core ID (the ID representing all CPU cores) are first sent to the setting interface.

The setting interface sets the thread 1 represented by tid1 to run on the group running core of the CPU group in which the thread 1 is located.

Step E16: The setting interface sends the received thread ID (tid1) to the CGroup virtual file system stored in the CPU core query module, to request the CGroup virtual file system to return a CPU core ID that is set for a CPU group in which the thread ID is located. The CPU core ID represents the group running core in the foregoing embodiment.

Step E17: The CPU core query module returns an identifier corresponding to a group running core that is set for the CPU group in which tid1 is located.

Step E18: If there is an intersection set between the CPU core represented by the configuration core ID corresponding to tid1 and the group running core corresponding to tid1, a running core of the thread 1 represented by tid1 may be set as a CPU core in the intersection set.

It should be noted herein that the CPU group in which the thread 1 is located has limited a CPU core, on which thread 1 is allowed to run, to a group running core of the CPU group of the thread 1. When the core binding module sends the full-core ID to the setting interface, a result of obtaining, by the setting interface, an intersection set between the group running core of the CPU group in which the thread 1 is located and all cores is still the group running core of the CPU group in which the thread 1 is located. Therefore, a setting result is as follows: The thread 1 runs on any CPU core in the group running core of the CPU group in which the thread 1 is located.

Step E19: After successfully setting the running core of the thread 1, the setting interface sends, to the core binding module, a message used to indicate that the setting of the running core of thread 1 (the thread represented by tid1) succeeds. After the running core of the thread 1 is set as the group running core of the CPU group in which the thread 1 is located, the thread 1 may run on any CPU core in the group running core of the CPU group in which the thread 1 is located.

Step E20: The core binding module continues to send tid2 and the full-core ID to the setting interface.

After receiving tid2 and the full-core ID, the setting interface sets a running core of the thread 2 as the group running core of the CPU group in which the thread 2 is located.

Step E21: The setting interface sends the received thread ID (tid2) to the CGroup virtual file system stored in the CPU core query module, to request the CGroup virtual file system to return a CPU core ID that is set for a CPU group in which the thread ID is located. The CPU core ID represents the group running core in the foregoing embodiment.

Step E22: The CPU core query module returns an identifier corresponding to a group running core that is set for the CPU group in which tid2 is located.

Step E23: If there is an intersection set between the CPU core represented by the configuration core ID corresponding to tid2 and the group running core corresponding to tid2, a running core of the thread 2 represented by tid2 may be set as a CPU core in the intersection set.

Step E24: After successfully setting the running core of the thread 2 represented by tid2, the setting interface sends, to the core binding module, a message used to indicate that the setting of the running core of tid2 succeeds.

It should be noted that, if the group running core of the initial CPU group of the thread 2 is a core 1 and a core 3, before the thread 2 is switched to the root group, the thread 2 may run on the core 1. When the scenario is disabled, although the thread 2 is switched back to the initial CPU group, the thread 2 may run on the core 1, or may run on the core 3. Therefore, when the scenario is disabled, after the running core of the thread 2 is successfully set (step E24), the current running core of the thread 2 may be denoted as a fourth CPU core, and the fourth CPU core may be the same as or different from the first CPU core.

In addition, for ease of description, when the scenario is disabled, after a running core (step E19) of a thread such as the thread 1 whose CPU group has not been switched is successfully set, a current running core of the thread 1 may be denoted as a third CPU core, and the third CPU core may be the same as or different from the first CPU core.

In another embodiment of this application, another manner may be used to implement the method for restoring to an initial state when the scenario corresponding to the task scheduling method described in the foregoing embodiment is disabled. In the task scheduling method, that the cache file is not set and that the CPU group of the thread 2 has been switched when the scenario is enabled are used as an example.

Figures 11A, 11B:
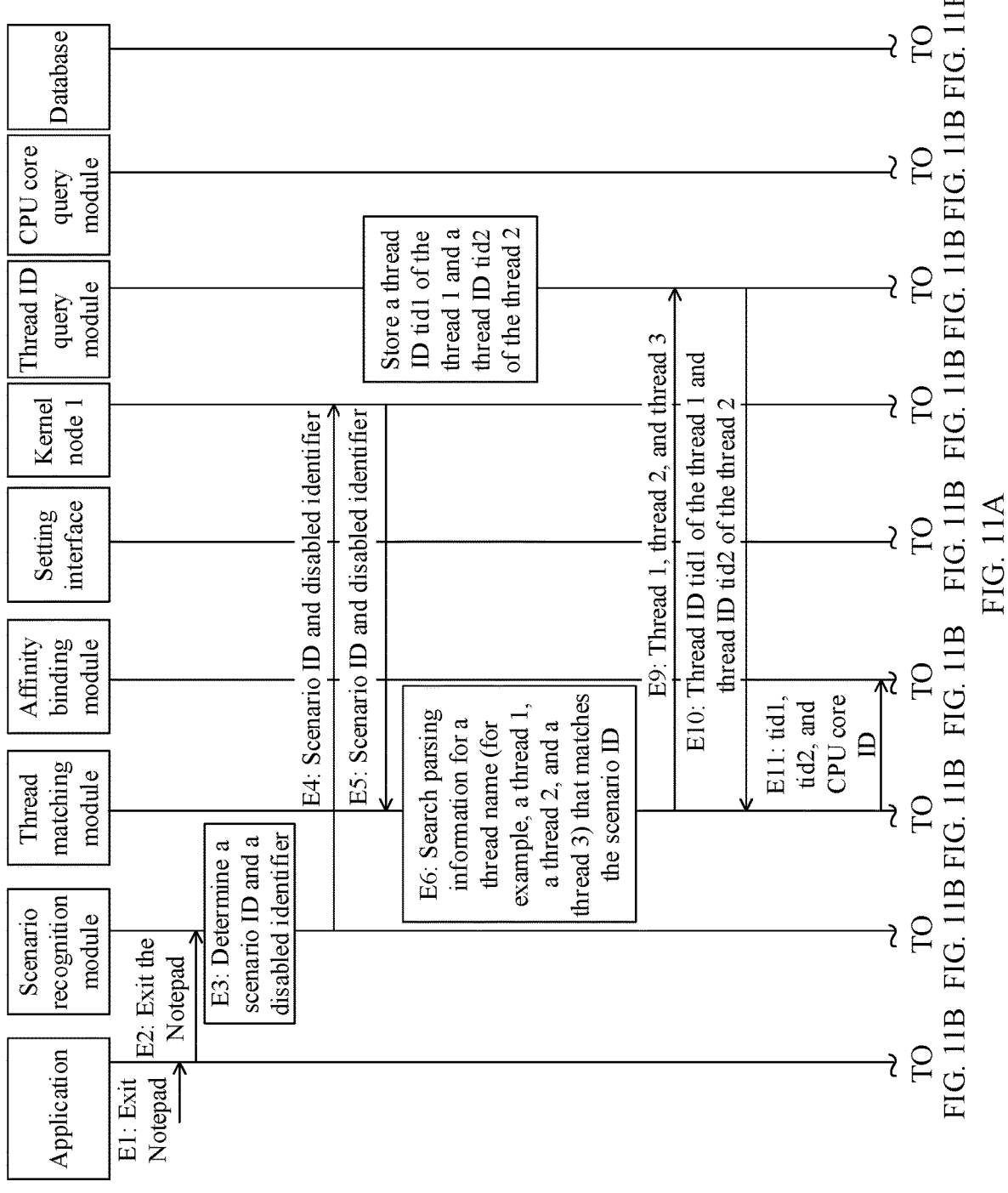
FIG. 11A to FIG. 11C are another sequence diagram of a task scheduling method when a scenario is disabled according to an embodiment of this application.
Figure 11B:
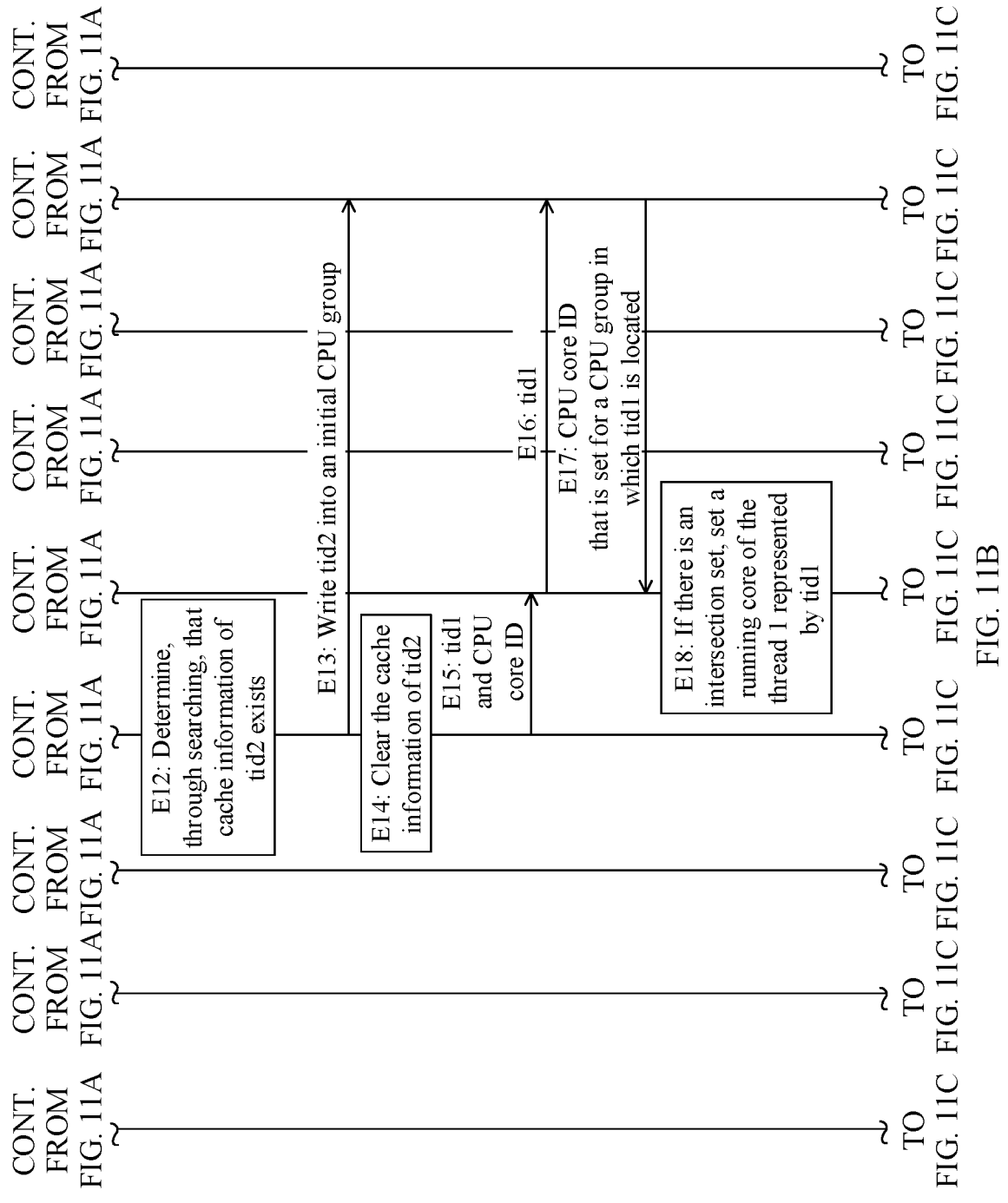
Figure 11C:
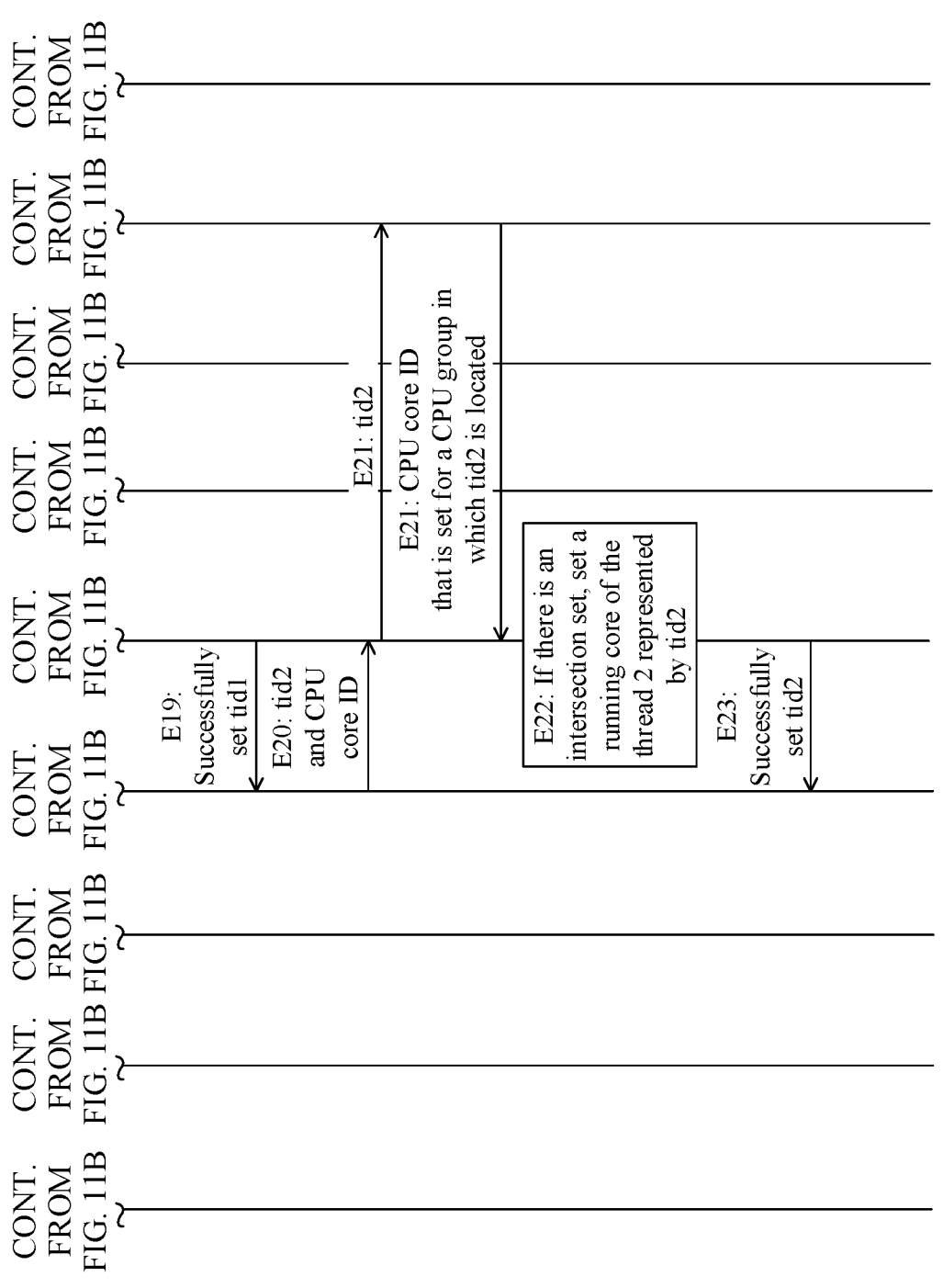

FIG. 11A to FIG. 11C are a sequence diagram of a method for restoring to an initial state when a scenario that supports task scheduling is disabled according to an embodiment of this application.

A difference from FIG. 10A to FIG. 10C includes: canceling step E7 and step E8 in the embodiment shown in FIG. 10A. In step E7 and step E8 in FIG. 10A, the thread matching module obtains, from the cache file, the thread ID to be sent to the core binding module. If the cache file is not set, the thread matching module obtains, from the proc file system, the thread ID to be sent to the core binding module.

If step E7 and step E8 are canceled in the embodiment shown in FIG. 11A to FIG. 11C, when step E9 is performed in FIG. 11A, the thread 1 in the process A, the thread 2 in the process B, and the thread 3 in the process C need to be searched for.

Step E10: A query result is the thread ID (tid1) of the thread 1 and the thread ID (tid2) of the thread 2.

As described above, the thread is not a thread that always runs after the electronic device is powered on, but is a thread that runs as a scenario is enabled and terminates as a scenario is disabled. If such a thread is configured for the scenario that supports task scheduling, the thread may also disappear from the proc file system when it is recognized that the scenario is disabled.

Step E9 in this embodiment of this application is completed before the thread terminates.

For another step in the embodiment shown in FIG. 11A to FIG. 11C, refer to the descriptions in the embodiment shown in FIG. 10A to FIG. 10C. Details are not described herein again.

Both FIG. 10A to FIG. 10C and FIG. 11A to FIG. 11C are described by using an example in which the CPU group of the thread 2 has been switched when the scenario is enabled. In actual application, when the CPU group of the thread 2 is not switched when the scenario is enabled, if cache information of the thread 2 is not found in step E12, step E13 does not need to be performed.

In addition, the foregoing embodiments are described by using an example in which the thread 3 cannot be found from the proc file system when the scenario is enabled. In actual application, it does not mean that a thread that cannot be found is necessarily configured in the configuration file. In an example, in the embodiment shown in FIG. 8A to FIG. 8C, if the thread ID of the thread 1, the thread ID of the thread 2, and the thread ID of the thread 3 can be obtained by querying the cache file in steps D1 and D2, step C9, step C10, and step D3 do not need to be performed.

It should be understood that sequence numbers of the steps in the foregoing embodiments do not mean execution sequences. The execution sequences of the processes should be determined based on functions and internal logic of the processes, and should not be construed as any limitation on the implementation processes of embodiments of this application.

An embodiment of this application further provides a computer-readable storage medium. The computer-readable storage medium stores a computer program, and when the computer program is executed by a processor, the steps in the foregoing method embodiments may be implemented.

An embodiment of this application further provides a computer program product. When the computer program product runs on a first device, the first device is enabled to implement the steps in the foregoing method embodiments.

When the integrated unit is implemented in the form of a software functional unit and sold or used as an independent product, the integrated unit may be stored in a computer-readable storage medium. Based on such an understanding, in this application, all or a part of the processes in the methods in the foregoing embodiments may be implemented by a computer program instructing related hardware. The computer program may be stored in a computer-readable storage medium. When the computer program is executed by a processor, the steps in the foregoing method embodiments may be implemented. The computer program includes computer program code, and the computer program code may be in a source code form, an object code form, an executable file, some intermediate forms, or the like. The computer-readable medium may include at least any entity or apparatus that can carry computer program code to a first device, a recording medium, a computer memory, a read-only memory (ROM, Read-Only Memory), a random access memory (RAM, Random Access Memory), an electrical carrier signal, a telecommunications signal, and a software distribution medium, for example, a USB flash drive, a removable hard disk, a magnetic disk, or an optical disc. In some jurisdictions, under legislation and patent practice, a computer-readable medium cannot be an electrical carrier signal or a telecommunications signal.

An embodiment of this application further provides a chip system. The chip system includes a processor, the processor is coupled to a memory, and the processor executes a computer program stored in the memory, to implement the steps in any one of the method embodiments of this application. The chip system may be a single chip or a chip module including a plurality of chips.

In the foregoing embodiments, descriptions of the embodiments have respective focuses. For a part that is not detailed or described in an embodiment, refer to related descriptions in other embodiments.

Persons of ordinary skill in the art may notice that the exemplary units and method steps described with reference to the embodiments disclosed in this specification can be implemented in electronic hardware, or a combination of computer software and electronic hardware. Whether these functions are implemented in a hardware or software manner depends on a specific application and a design constraint of a technical solution. Persons skilled in the art may use different methods to implement the described functions for each specific application, but it should not be considered that the implementation goes beyond the scope of this application.

The foregoing embodiments are merely used to describe the technical solutions of this application, but not limit the technical solutions of this application. Although this application is described in detail with reference to the foregoing embodiments, persons of ordinary skill in the art should understand that they may still modify the technical solutions described in the foregoing embodiments, or perform equivalent replacement on some technical features. However, these modifications or replacements do not make the essence of the corresponding technical solutions depart from the spirit and scope of the technical solutions in the embodiments of this application, and shall fall within the protection scope of this application.

What is claimed is:

1. A task scheduling method, comprising:

displaying, by an electronic device, an interface of a first application, wherein a first thread runs on a first central processing unit (CPU) core, and the first thread is used for display processing of the interface of the first application;

receiving, by the electronic device, first input of a stylus in the interface of the first application for a first time;

determining that a current scenario of the first input of the stylus is an enabled preset scenario based at least in part on determining a match between an identifier of the preset scenario and an identifier of the current scenario in addition to determining an enabled identifier associated with the first input, wherein the first thread is configured for the identifier of the preset scenario; and in response to the determination, controlling, by the electronic device, the first thread to run on a second CPU core, wherein a computing capability of the second CPU core is higher than a computing capability of the first CPU core.

2. The method according to claim 1, wherein the first thread is in a first control group, each thread in the first control group is allowed to run on any CPU core in a first CPU core set, and the first CPU core is in the first CPU core set.

3. The method according to claim 2, wherein after the controlling, by the electronic device, the first thread to run on a second CPU core, the method further comprises:

receiving, by the electronic device, a second operation, wherein the second operation comprises an operation of exiting the first application, an operation of switching the first application to background, or an operation of touching the interface of the first application by a user; and in response to receiving the second operation, controlling, by the electronic device, the first thread to run on a third CPU core, wherein the third CPU core is in the first CPU core set.

4. The method according to claim 3, wherein the second operation is the operation of touching the interface of the first application by the user, and the first input of the stylus in the interface of the first application comprises:

input generated when the stylus is in contact with a handwriting interface of the first application for a first time after the electronic device receives the second operation.

5. The method according to claim 4, wherein the display processing comprises at least one of drawing processing, rendering processing, and composition processing.

6. The method according to claim 2, wherein before the controlling, by the electronic device, the first thread to run on a second CPU core, the method further comprises:

setting, by the electronic device, the first thread as a thread in a second control group, wherein each thread in the second control group is allowed to run on any CPU core in a second CPU core set, and the second CPU core is in the second CPU core set.

7. The method according to claim 6, wherein after controlling, by the electronic device, the first thread to run on a second CPU core, the method further comprises:

receiving, by the electronic device, a second operation, wherein the second operation comprises an operation of exiting the first application, an operation of switching the first application to background, or an operation of touching the interface of the first application by a user;

in response to receiving the second operation, setting, by the electronic device, the first thread as a thread in the first control group; and controlling, by the electronic device, the first thread to run on a fourth CPU core, wherein the fourth CPU core is in the first CPU core set.

8. The method according to claim 1, wherein the first input of the stylus in the interface of the first application comprises:

input generated when the stylus is in contact with a handwriting interface of the first application for a first time after the first application runs in foreground.

9. The method according to claim 7, wherein before the setting, by the electronic device, the first thread as a thread in a second control group, the method further comprises:

storing, by the electronic device, the first thread and the first control group into a first storage space; and correspondingly, before the setting, by the electronic device, the first thread as a thread in the first control group, the method comprises:

obtaining, by the electronic device, the first thread and the first control group by querying the first storage space.

10. The method according to claim 6, wherein the setting, by the electronic device, the first thread as a thread in a second control group comprises:

obtaining, by the electronic device, a third CPU core set, wherein the third CPU core set is a CPU core set configured for the first thread; and when the first CPU core set and the third CPU core set do not comprise same CPU cores, setting, by the electronic device, the first thread as a thread in the second control group, wherein the second CPU core is one of same CPU cores comprised in the second CPU core set and the third CPU core set.

11. The method according to claim 6, wherein the controlling, by the electronic device, the first thread to run on a second CPU core comprises:

obtaining, by the electronic device, a third CPU core set, wherein the third CPU core set is a CPU core set configured for the first thread;

setting, by the electronic device as a CPU core in the third CPU core set, a CPU core on which the first thread runs;

when the setting fails, setting, by the electronic device, the first thread as a thread in the second control group, wherein the second CPU core set and the third CPU core set comprise same CPU cores; and after setting the first thread as a thread in the second control group, setting, by the electronic device as a CPU core in the third CPU core set, the CPU core on which the first thread runs, wherein after the setting succeeds, the first thread runs on the second CPU core, and the second CPU core is one of the same CPU cores comprised in the second CPU core set and the third CPU core set.

12. The method according to claim 11, wherein the method further comprises:

after the electronic device is powered on, obtaining, by the electronic device, a configuration file, wherein the configuration file is used to configure the first thread for the preset scenario identifier and configure the third CPU core set for the first thread;

parsing, by the electronic device, the configuration file to obtain parsing information;

storing, by the electronic device, the parsing information based on a map data structure; and correspondingly, the obtaining, by the electronic device, a third CPU core set comprises:

in response to the first input, determining, by the electronic device, the preset scenario identifier; and obtaining, by the electronic device from the parsing information, the first thread configured for the preset scenario identifier and the third CPU core set configured for the first thread.

13. The method according to claim 12, wherein the obtaining, by the electronic device from the parsing information, the first thread configured for the preset scenario identifier comprises:

obtaining, by the electronic device from the parsing information, a first thread name of the first thread configured for the preset scenario identifier; and correspondingly, the controlling, by the electronic device, the first thread to run on a second CPU core comprises:

searching, by the electronic device, a first file system for a thread identifier that matches the first thread name, wherein the first file system stores a thread name and a thread identifier of a thread currently running on the electronic device; and when the electronic device obtains, by searching the first file system, a first thread identifier corresponding to the first thread name, controlling, by the electronic device, the first thread represented by the first thread identifier to run on the second CPU core.

14. The method according to claim 13, wherein before the searching, by the electronic device, a first file system for a thread identifier corresponding to the first thread name, the method further comprises:

searching, by the electronic device, a second file for the thread identifier corresponding to the first thread name;

correspondingly, the searching, by the electronic device, a first file system for a thread identifier corresponding to the first thread name comprises:

when the electronic device does not obtain, by searching the second file, the thread identifier corresponding to the first thread name, searching, by the electronic device, the first file system for the thread identifier corresponding to the first thread name; and correspondingly, when the electronic device obtains, by searching the first file system, the first thread identifier corresponding to the first thread name, the method further comprises:

storing, by the electronic device into the second file, the first thread identifier corresponding to the first thread name.

15. The method according to claim 14, wherein after the searching, by the electronic device, a second file for the thread identifier corresponding to the first thread name, the method further comprises:

when the electronic device obtains, by searching the second file, the first thread identifier corresponding to the first thread name, setting, by the electronic device, the first thread represented by the first thread identifier to run on the second CPU core.

16. The method according to claim 2, wherein the controlling, by the electronic device, the first thread to run on a second CPU core comprises:

obtaining, by the electronic device, a third CPU core set, wherein the third CPU core set is a CPU core set configured for the first thread; and when the first CPU core set and the third CPU core set comprise same CPU cores, controlling, by the electronic device, the first thread to run on the second CPU core, wherein the second CPU core is one of the same CPU cores.

17. An electronic device, comprising one or more processors and a memory, wherein the memory is coupled to the one or more processors, the memory is configured to store computer program code, the computer program code comprises computer instructions, the one or more processors are configured to invoke the computer instructions, and invoking the computer instructions causes the electronic device to perform the following operations:

displaying an interface of a first application, wherein a first thread runs on a first central processing unit (CPU core, and the first thread is used for display processing of the interface of the first application;

receiving first input of a stylus in the interface of the first application for a first time;

determining that a current scenario of the first input of the stylus is an enabled preset scenario based at least in part on determining a match between an identifier of the preset scenario and an identifier of the current scenario in addition to determining an enabled identifier associated with the first input, wherein the first thread is configured for the identifier of the preset scenario; and in response to the determination, controlling the first thread to run on a second CPU core, wherein a computing capability of the second CPU core is higher than a computing capability of the first CPU core.

18. A non-transitory computer-readable storage medium, comprising computer instructions, wherein the computer instructions, when run on an electronic device, cause the electronic device to perform operations comprising:

displaying an interface of a first application, wherein a first thread runs on a first central processing unit (CPU) core, and the first thread is used for display processing of the interface of the first application;

receiving first input of a stylus in the interface of the first application for a first time;

determining that a current scenario of the first input of the stylus is an enabled preset scenario based at least in part on determining a match between an identifier of the preset scenario and an identifier of the current scenario in addition to determining an enabled identifier associated with the first input, wherein the first thread is configured for the identifier of the preset scenario; and in response to the determination, controlling the first thread to run on a second CPU core, wherein a computing capability of the second CPU core is higher than a computing capability of the first CPU core.

\* \* \* \* \*